(12) United States Patent
Goldberg

(10) Patent No.: US 7,783,018 B1
(45) Date of Patent: Aug. 24, 2010

(54) DIRECTORY DISPLAY AND CONFIGURABLE ENTRY SYSTEM

(76) Inventor: Mark S. Goldberg, 44 Franklin St., Northport, NY (US) 11768

( * ) Notice: Subject to any disclaimer, the term of this patent is extended or adjusted under 35 U.S.C. 154(b) by 1096 days.

(21) Appl. No.: 11/473,986

(22) Filed: Jun. 24, 2006

(51) Int. Cl.
*H04M 11/00* (2006.01)

(52) U.S. Cl. .................. 379/102.06; 709/203; 709/204

(58) Field of Classification Search ............. 379/102.06
See application file for complete search history.

(56) References Cited

U.S. PATENT DOCUMENTS

| | | | |
|---|---|---|---|
| 4,937,855 A | 6/1990 | McNab et al. | |
| 5,252,955 A | 10/1993 | Davis et al. | |
| 5,475,741 A | 12/1995 | Davis et al. | |
| 5,517,185 A | 5/1996 | Acimovic et al. | |
| 5,673,016 A | 9/1997 | Lutes | |
| 6,317,489 B1 | 11/2001 | Parsadayan | |
| 6,317,777 B1 * | 11/2001 | Skarbo et al. | 709/204 |
| 6,405,172 B1 | 6/2002 | Baker et al. | |
| 6,976,032 B1 | 12/2005 | Hull et al. | |
| 7,213,013 B1 * | 5/2007 | Subramaniam et al. | 707/610 |
| 7,466,439 B2 * | 12/2008 | Lapstun et al. | 379/100.07 |
| 7,466,810 B1 * | 12/2008 | Quon et al. | 379/201.01 |
| 7,523,385 B2 * | 4/2009 | Nguyen et al. | 709/203 |
| 7,606,741 B2 * | 10/2009 | King et al. | 705/27 |
| 7,624,421 B2 * | 11/2009 | Ozzie et al. | 709/203 |
| 7,636,752 B2 * | 12/2009 | Madsen et al. | 709/204 |
| 2003/0050976 A1 * | 3/2003 | Block et al. | 709/203 |
| 2004/0148340 A1 * | 7/2004 | Cotte | 709/203 |
| 2004/0148342 A1 * | 7/2004 | Cotte | 709/203 |
| 2005/0149617 A1 * | 7/2005 | Turnbull et al. | 709/203 |
| 2005/0152307 A1 | 7/2005 | Oberoi | |

OTHER PUBLICATIONS

Alpha Communications, "AlphaEntry Software V1.02—User Manual", Rev 2 (Mar. 2006), First Posted on Web in Nov. 2005).
Alpha Communications, "RY032AE AlphaEntry 32-Output Signal Relay Board—Installation and Wiring Instructions", Rev 1 (Mar. 2006), First Posted on Web in Mar. 2006).
Alpha Communications, "AlphaEntry Database Definition Example", Jun. 2006.

* cited by examiner

*Primary Examiner*—Curtis Kuntz
*Assistant Examiner*—Maria El-Zoobi
(74) *Attorney, Agent, or Firm*—Island Patent; F. Scott Tierno

(57) ABSTRACT

A directory display and configurable entry system having a user interface providing an intuitive multi-page graphical user interface useful for enabling a user to readily access occupant related information that is contained in a database of the system. The system may also include a relay interface module, which may be remotely located from a computer unit of the system. The relay interface module enables either new and or legacy devices to be coupled to the hardware of the system, including the computer unit. This abstract is provided to comply with rules requiring an abstract, and is submitted with the intention that it will not be used to interpret or limit the scope and meaning of the claims.

33 Claims, 23 Drawing Sheets

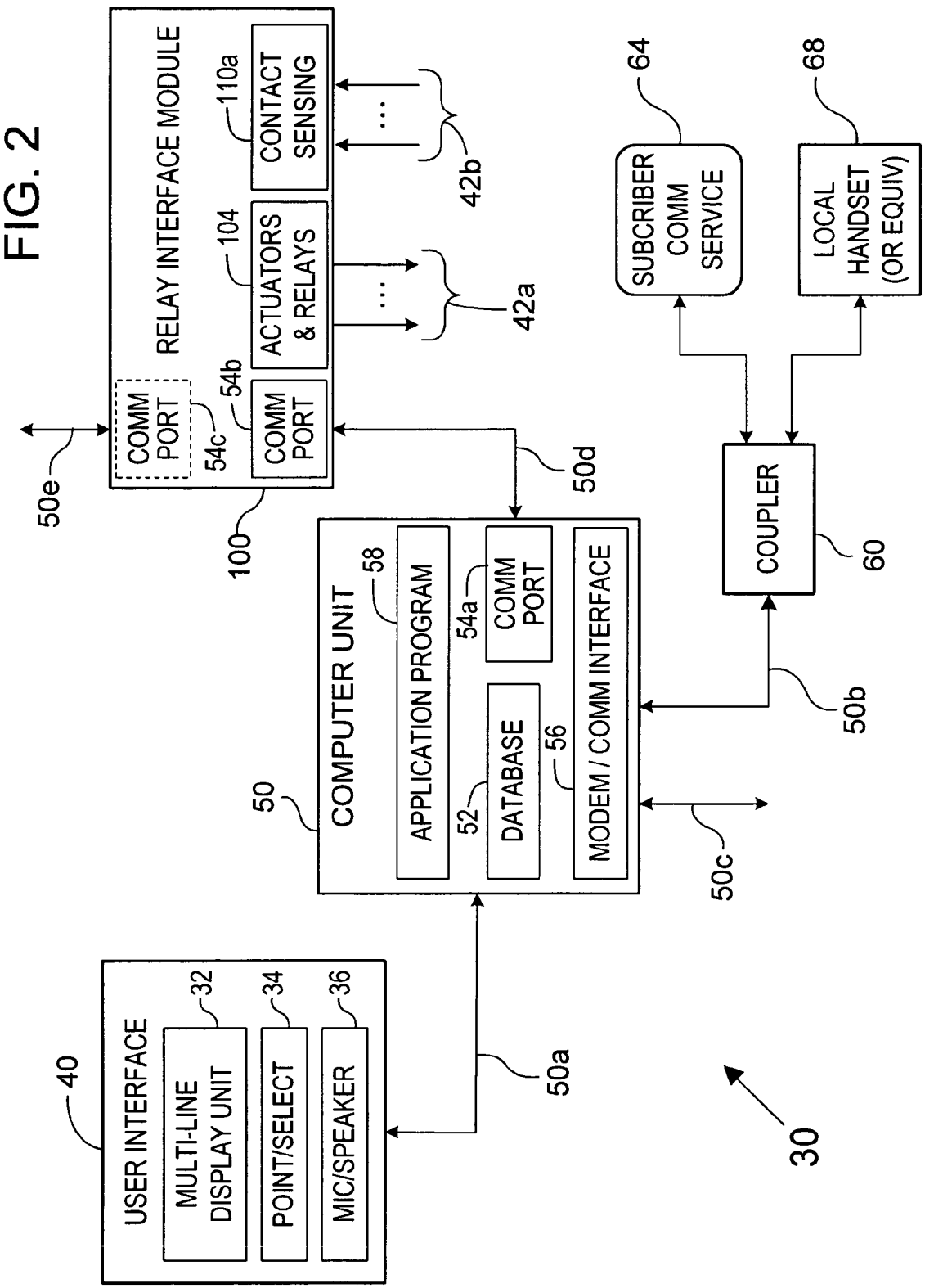

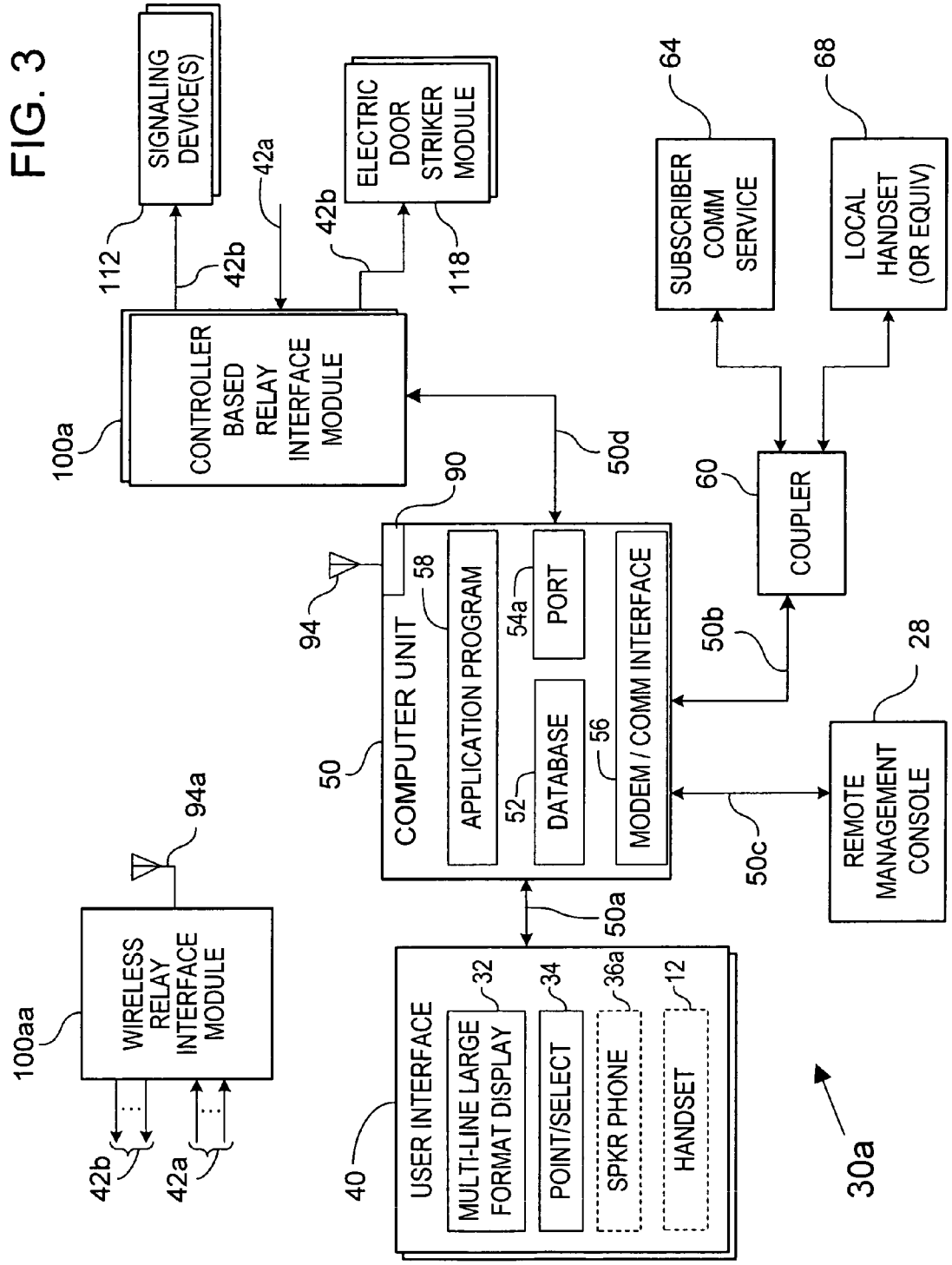

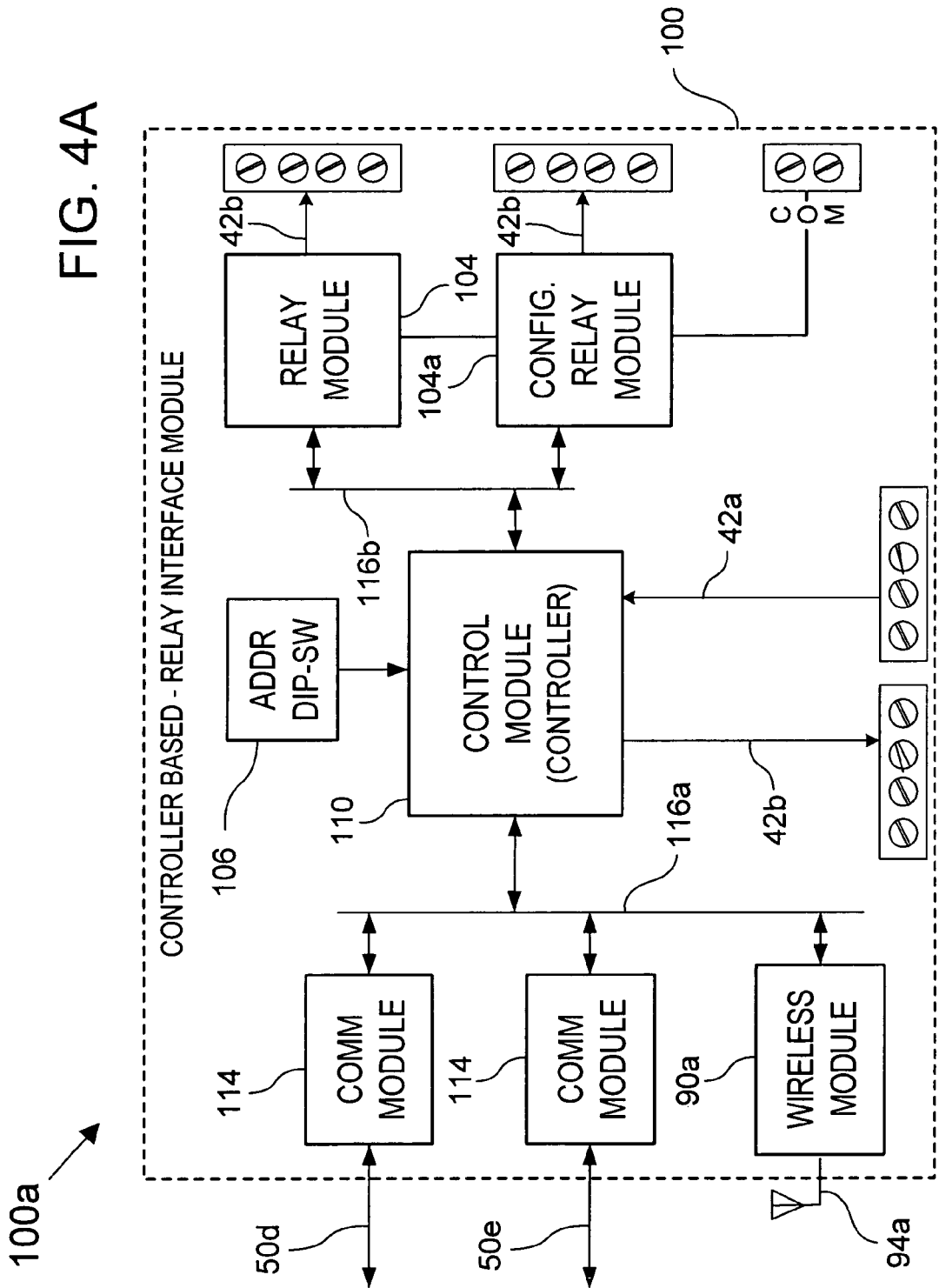

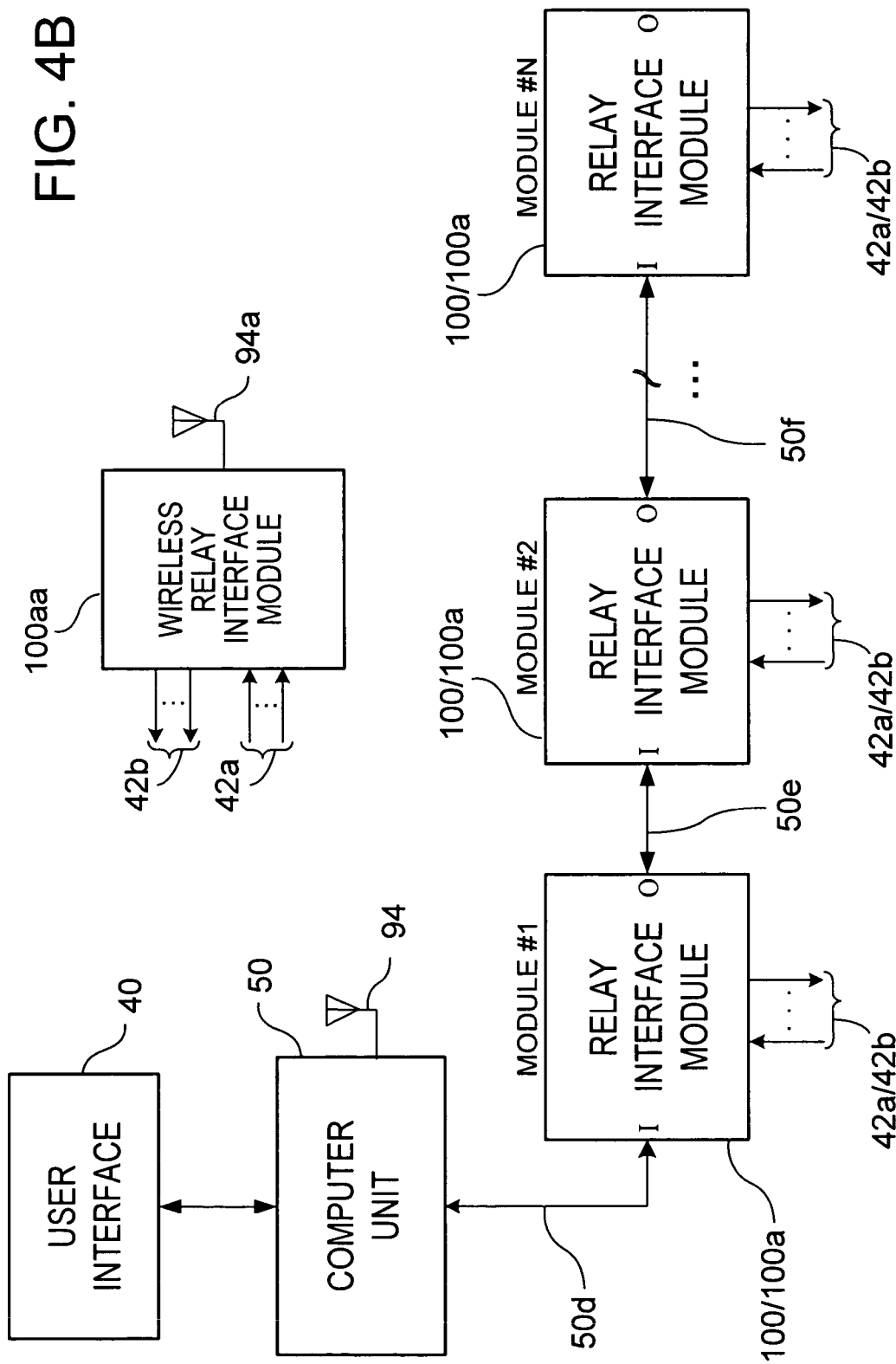

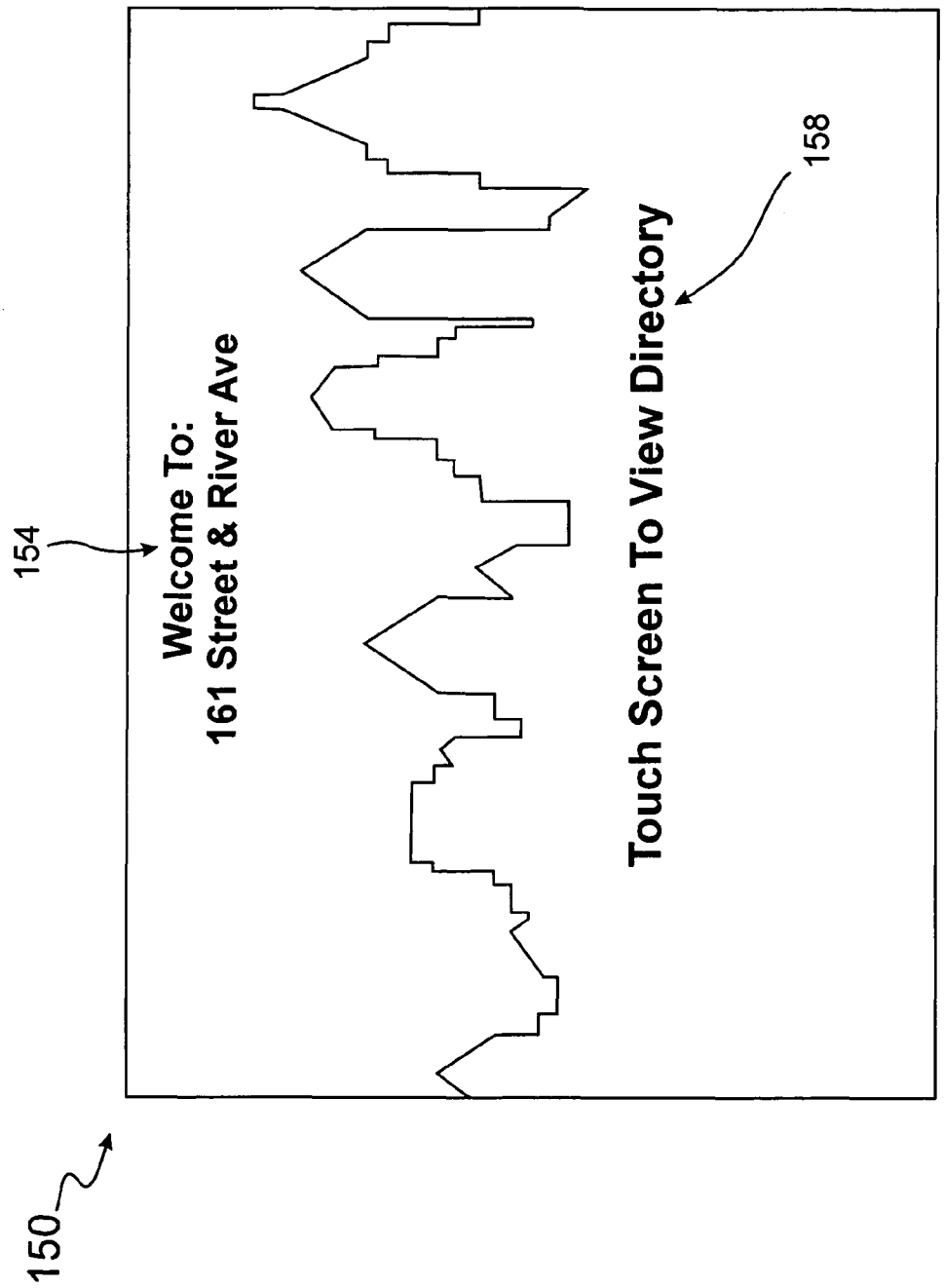

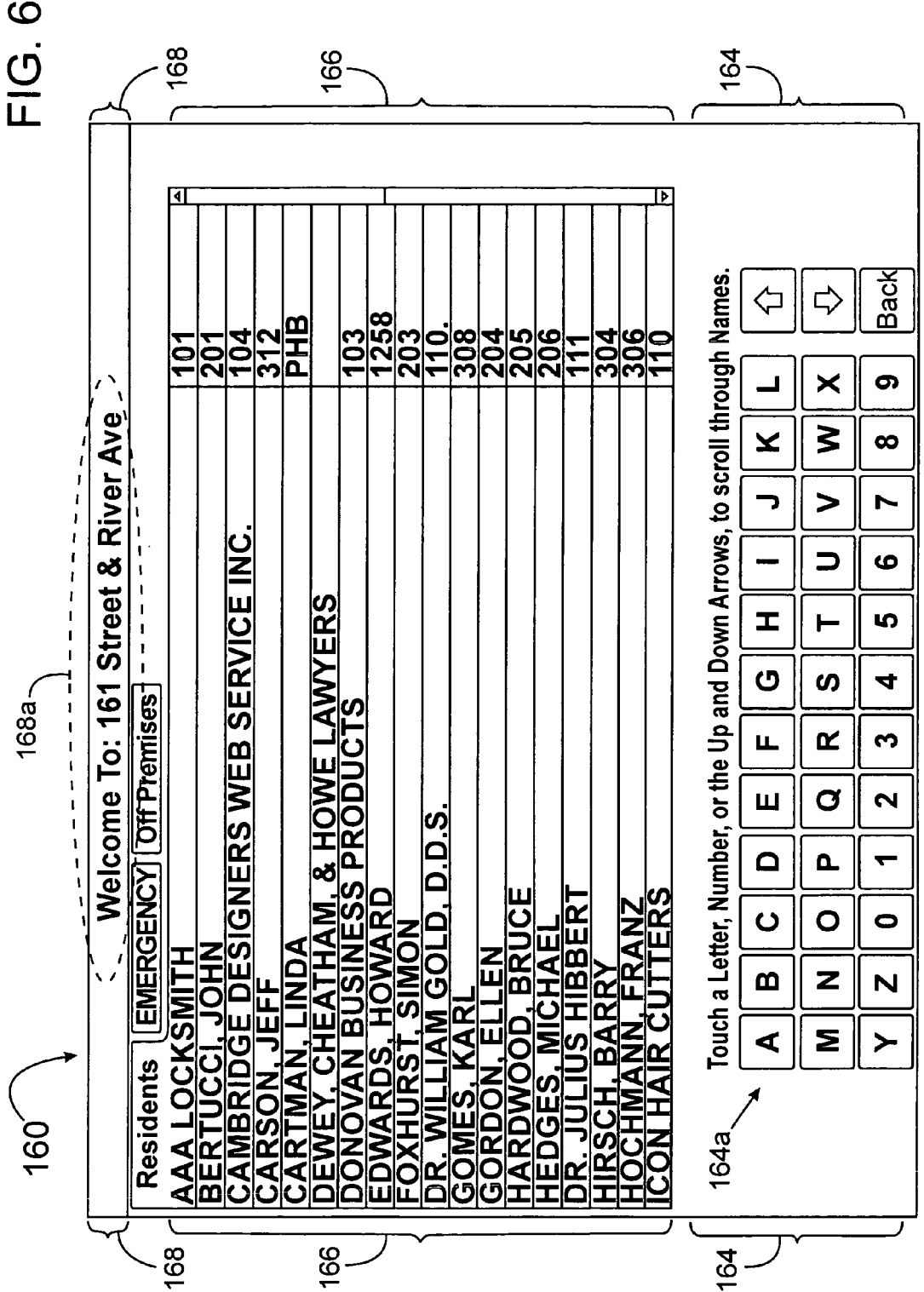

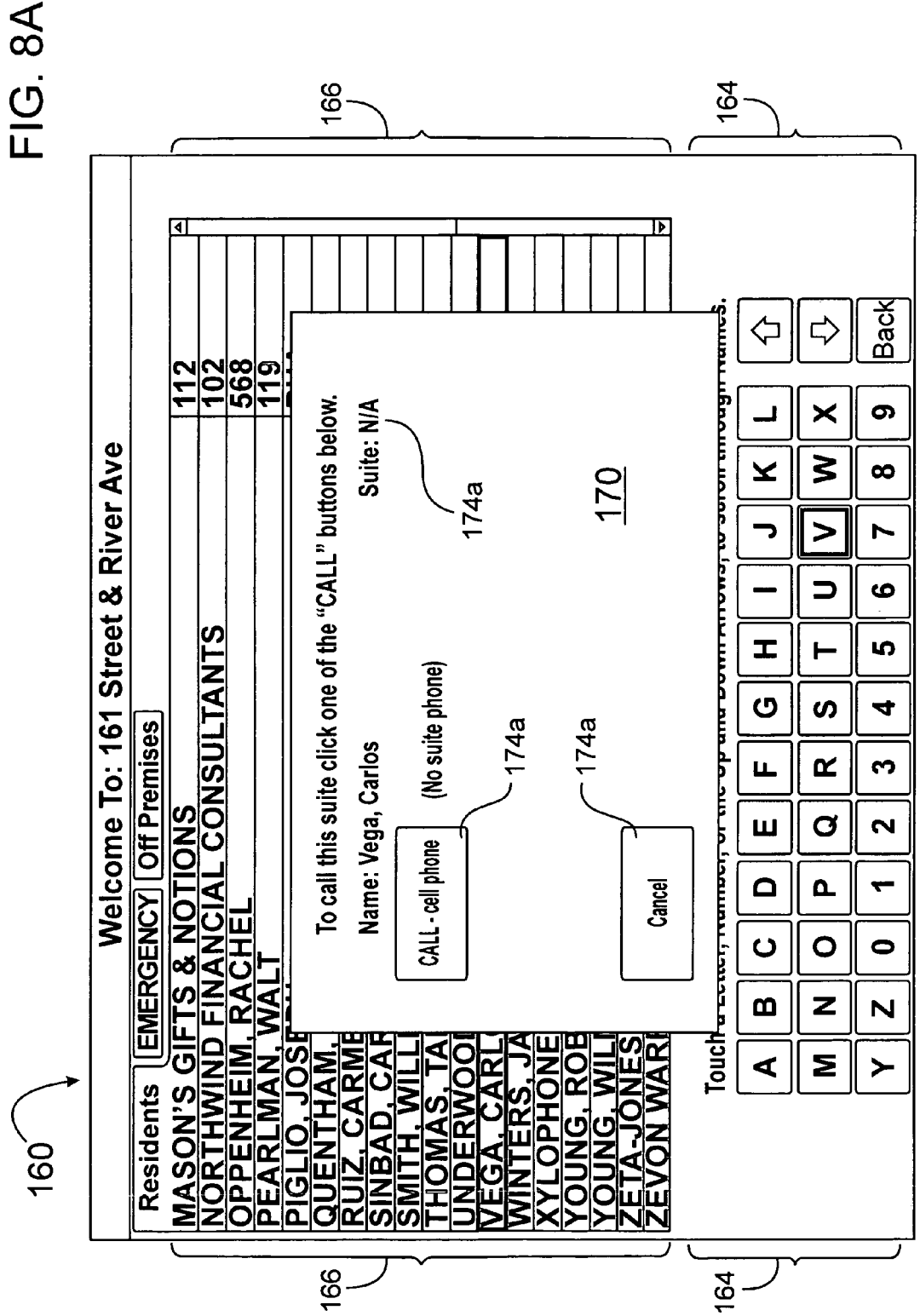

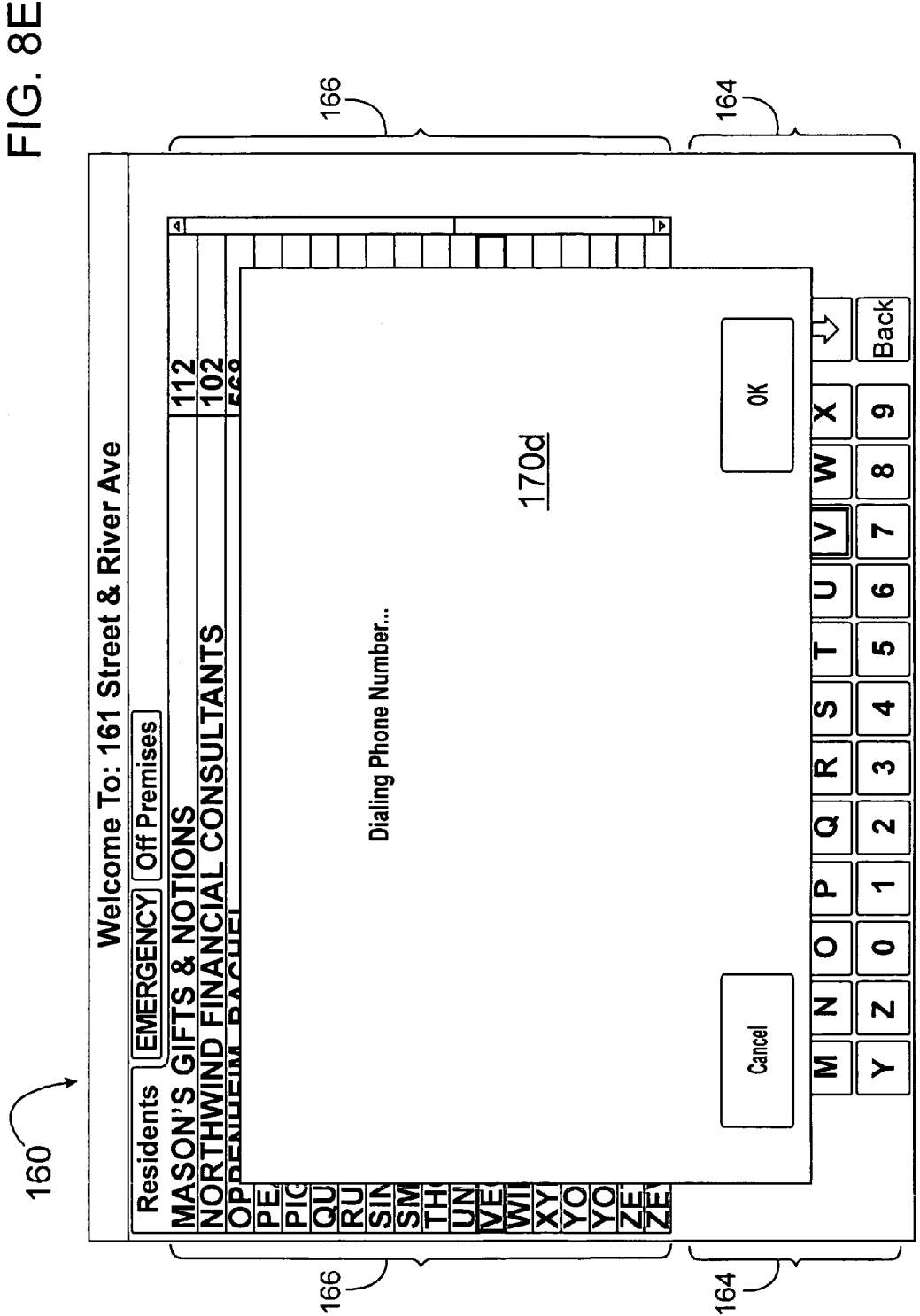

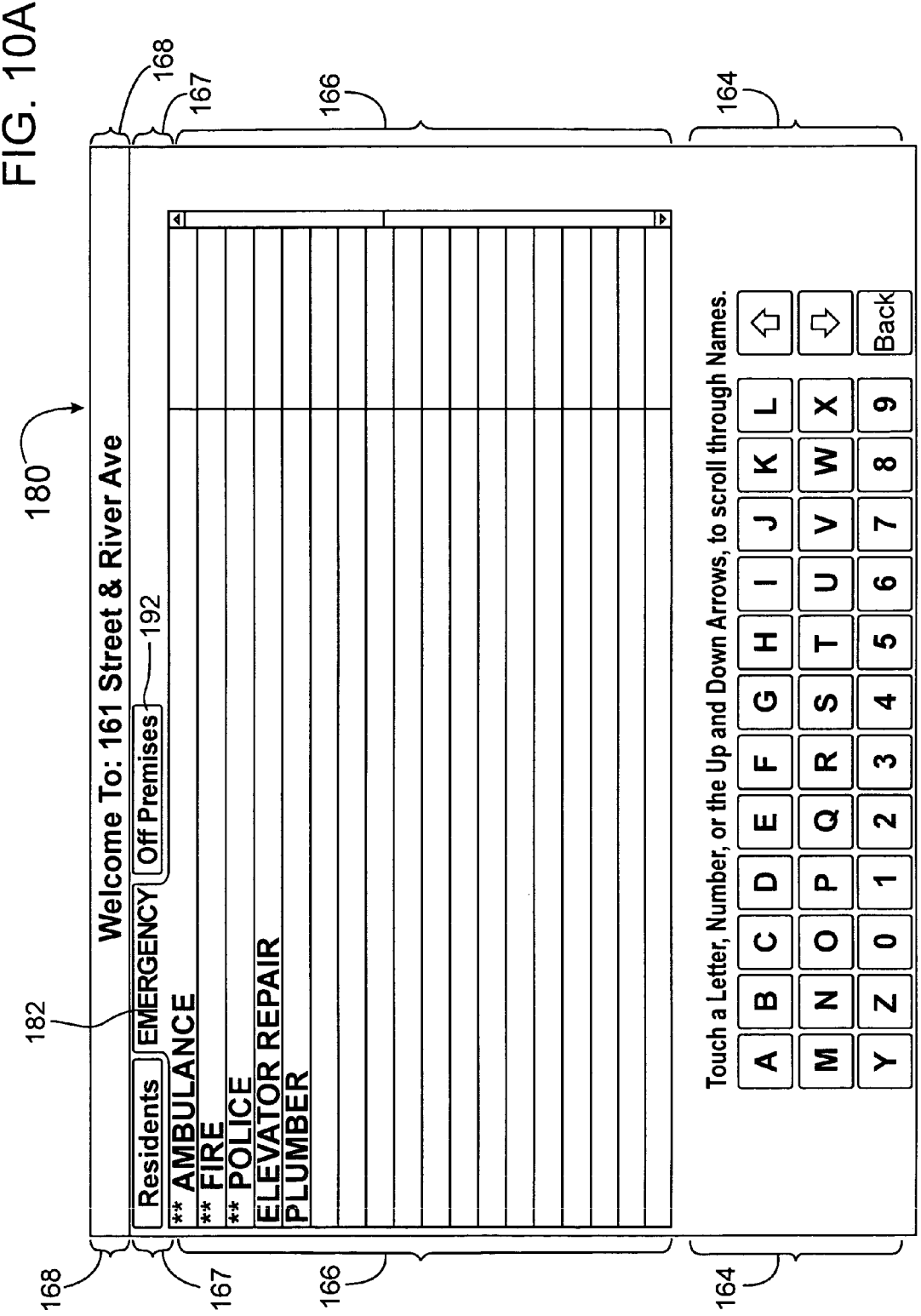

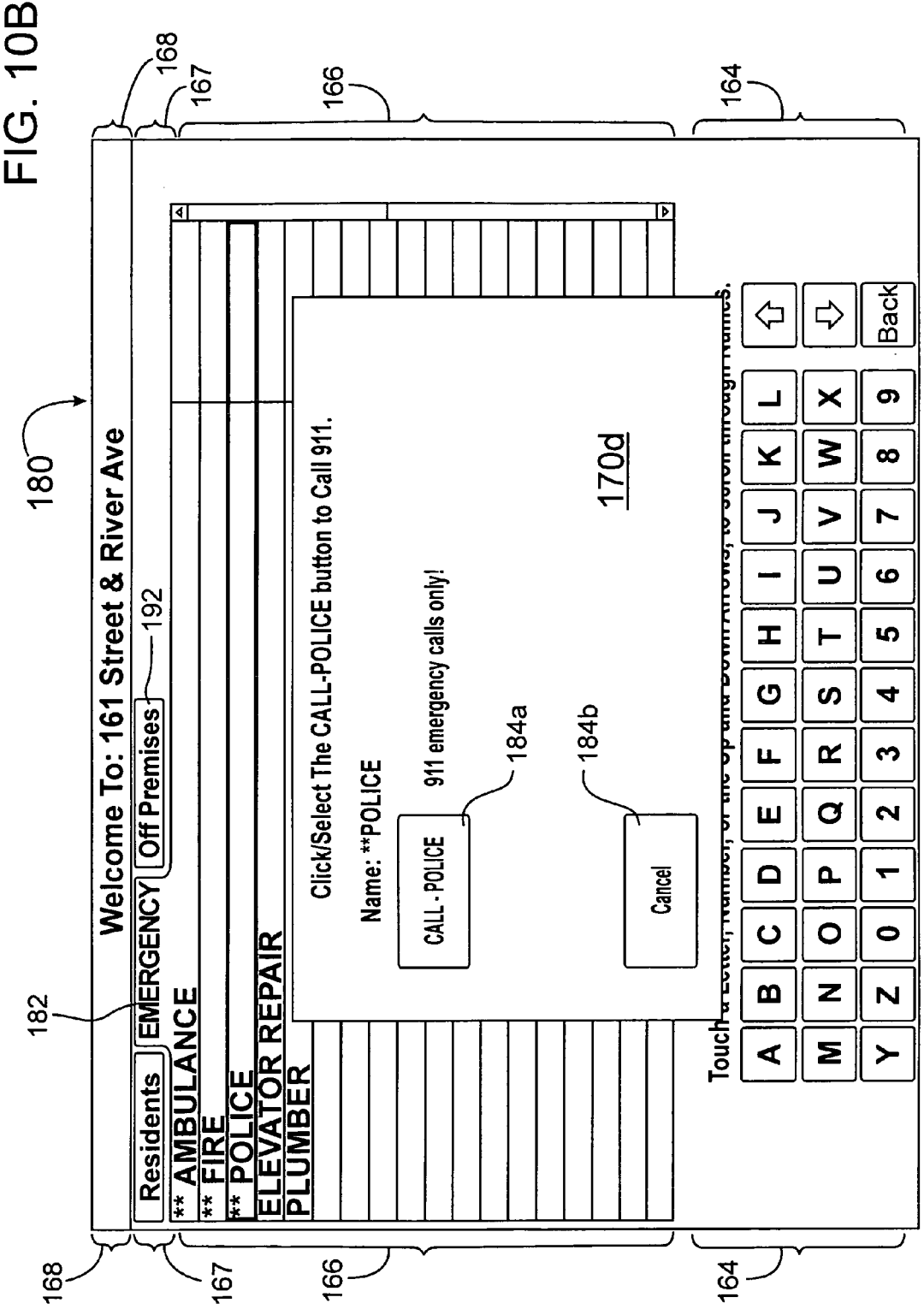

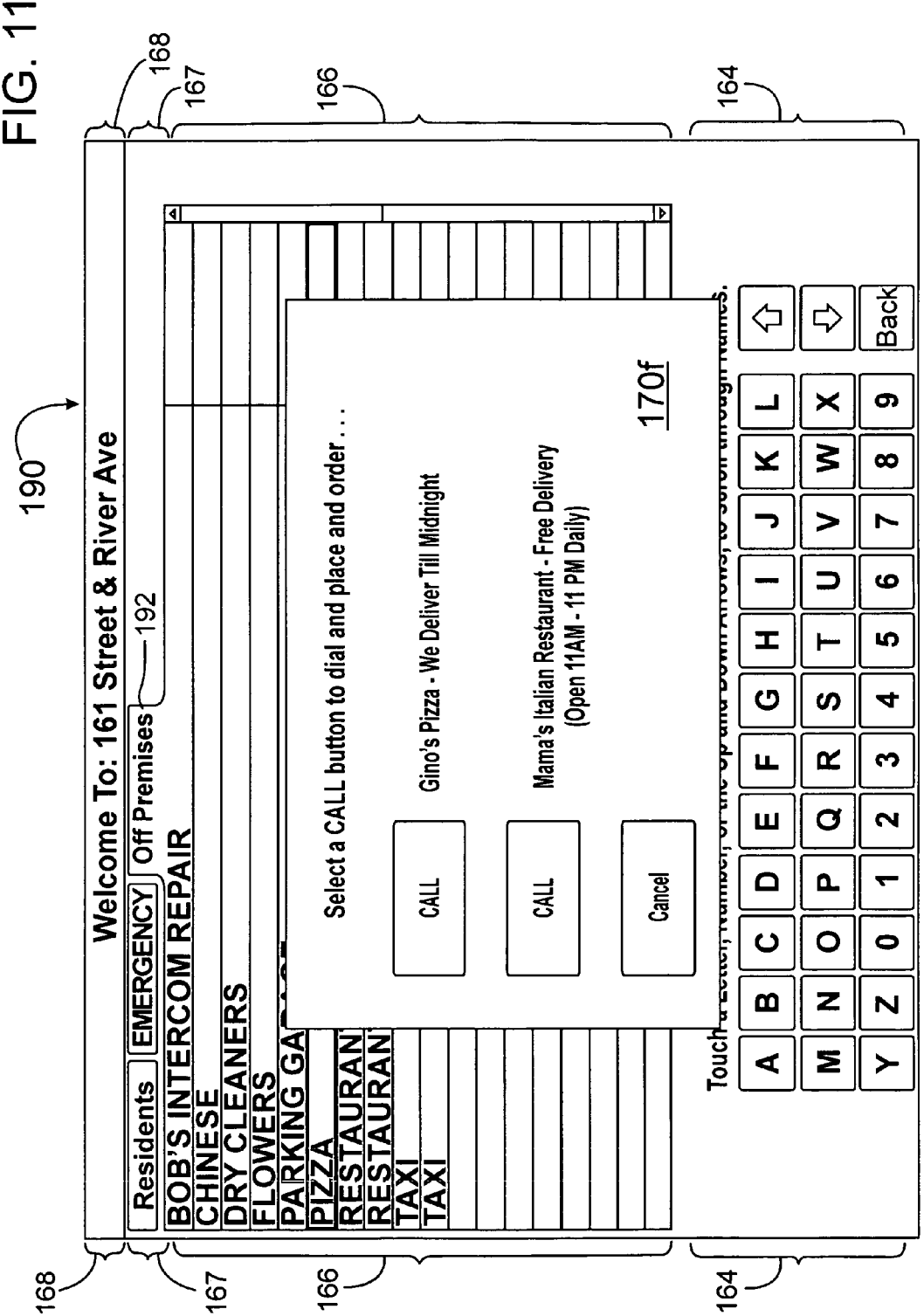

FIG. 12B

Define Holiday Dates / Images [X]

| Holiday Name | First Day | Last Day | Image |
|---|---|---|---|
| New Years Day | 01/01 | 01/01 | NewYears.gif |
| Independence D... | 07/04 | 07/04 | July4th.gif |
| Thanksgiving | 11/21 | 11/28 | Thanksgiving.gif |
| Christmas Time | 12/01 | 12/25 | Christmas.gif |
| New Years Day | 12/26 | 12/31 | NewYears.gif |

- Add New Holiday
- Delete Selected Holiday 210-1a 210-1

FIG. 12C

Define Holiday Dates / Images [X]

First Day of Holiday
[12 - December ▼] [31 ▼]

Last Day of Holiday
[01 - January ▼] [01]

Holiday Name
[New Years Day]

Image     Refresh Image List
[NewYears.gif ▼]

[Cancel]  [Update]

Low-Quality Image Preview:

*HAPPY NEW YEAR!*

Residents Editor

Residents | Emergency | Off Premises

- AAA Locksmith
- Bertucci, John
- Cambridge Designers
- Carson, Jeff
- Cartman, Linda
- Dewey, Cheatham, & Howe Lawyers
- Donovan Business Products
- Edwards, Howard
- Foxhurst, Simon
- Dr. William Gold, D.D.S
- Gomes, Karl
- Gordon, Ellen
- Hardwood, Bruce
- Hedges, Michael
- Dr. Julius Hibbert
- Hirsch, Barry
- Hochmann, Franz
- Icon Hair Cutters
- Jones, Mitch
- Kent, Clark (230)

Suite #1: [ ]

○ This is a Residential listing.
First Name: [ ]
Last Name (sorted by this name): [ ]

○ This is a Commercial listing.
Business Name: [ ]

Stat Sort Position: [ ]

Button 1
○ Dial Phone ○ Activate Relay

Button 2
○ Dial Phone ○ Activate Relay

Button 3
○ Dial Phone ○ Activate Relay

[New] [Add] [Remove] [Cancel]

[Close]

Table 1

| Record Field Names | Field Description | Data Type |
|---|---|---|
| res_type | listing type: residential, commercial, etc. | string, 1 |
| last_name | last name of occupant | string, 100 |
| first_name | first name of occupant | string, 100 |
| company_name | name of commercial occupant | string, 100 |
| sort_index | start character position for sorting | string, 50 |
| id_number | unique identification number for occupant | long integer |
| suite | number or designation of occupant suite/aprt. | string, 50 |
| button_1_type | contact button 1 type (phone or relay) | string, 1 |
| button_2_type | contact button 2 type (phone or relay) | string, 1 |
| phone_1 | telephone number for button 1 | string, 10 |
| phone_2 | telephone number for button 2 | string, 10 |
| phone_1_label | phone 1 contact button label | string, 25 |
| phone_2_label | phone 2 contact button label | string, 25 |
| phone_1_comment | phone 1 comment text | string, 100 |
| phone_2_comment | phone 2 comment text | string, 100 |
| button_1_relay_num | button 1 relay number (1 to n) | string, 3 |
| button_1_board_num | button 1 board number | string, 3 |
| button_2_relay_num | button 2 relay number (1 to n) | string, 3 |
| button_2_board_num | button 2 board number | string, 3 |

Table 2

| Record Field Names | Field Description | Data Type |
|---|---|---|
| welcome_time | Idle number of seconds before welcome displayed | integer |
| screen_sec_code | security code used to edit settings and exit | string, 4 |
| loc_name | name of location using directory display | string, 100 |
| slide_show_enable | welcome screen slide show enable (on/off) | integer |
| modem_comm_port | serial port number of modem | string, 2 |
| interface_port | communication/interface port number | string, 2 |
| relay_length | number of seconds relay is energized when activated | integer |
| show_tabs | show 'emergency' & 'off-prem' tabs enables | integer |
| scrn_sec_code | Idle number of seconds before welcome displayed | integer |

DIRECTORY DISPLAY AND CONFIGURABLE ENTRY SYSTEM

TECHNICAL FIELD

The present invention relates most generally to building directory and telephone entry systems. More particularly, the invention relates to a directory display means and method including a multi-page graphical user interface, which is configurable for providing standard and enhanced telephone entry and occupant contact functions.

BACKGROUND

The use of intercom and telephone entry systems is well known in the art. A classic type of entry unit 10, which is depicted in FIG. 1, includes a housing or case, such as housing 2. These units are often substantially self-contained, and mounted near an entry exit doorway. Typically a text type display is provided, for example, as shown a legacy display 4 may be provided. These well known systems also include a plurality of mechanical switches, such as pushbutton keypad 6a of FIG. 1, usually further including an up-arrow key and a down-arrow key. These latter two keys enable the user to move up and down through a plurality of records when the number of records is greater than the number of lines on the legacy display. Importantly, the keypad 6a is a numeric keypad. Traditionally, a function provided by the keypad is to enable a user (e.g., visitor to the building) to enter an occupant code. Upon entry of the code, a user may be alerted to pick up a nearby handset 12, as a phone or buzzer of the occupant is activated to indicate the arrival of the user/visitor.

Another feature taught by the prior art is depicted in FIG. 1 by round wheel or dial 6b, which is coupled to a structure such as a rotary encoder. A user may use the dial and rotary encoder 6b, to "sequentially" move through the first letters of the last name of the building's occupants. A skilled individual may note that the function of the dial/encoder wheel is actually somewhat similar to the up-arrow and down-arrow keys, especially if the hardware supports a press and hold mode, for auto-repeating a key press. That is, both the dial/encoder wheel and the up/down keys enable a user to move 'sequentially' through a listing of the available occupants. If the building is large, this type of an interface is not very efficient, requiring a user to possibly step through a significant number of occupant records.

Accordingly, it would be most desirable to provide an improved directory system, and method of use, wherein an occupant of a building, even a large building with many occupants, can be readily and (relatively) efficiently located. In addition, it would be most desirable to provide a system that employs a graphical user interface (GUI) that is intuitive, simple, and further provides prompts and easy to follow instructions. The most preferred embodiments of the graphical user interface of the invention would provide a multi-page interface enabling an occupant to be readily located, and further readily contacted by way of possibly a plurality of available contact icons or electronic buttons.

A number of other characteristics, advantages, and or associated novel features of the present invention, will become clear from the description and figures provided herein. Attention is called to the fact, however, that the drawings are illustrative only. In particular, the embodiments included and described, have been chosen in order to best explain the principles, features, and characteristics of the invention, and its practical application, to thereby enable skilled persons to best utilize the invention and a wide variety of embodiments providable that are based on these principles, features, and characteristics. Accordingly, all equivalent variations possible are contemplated as being part of the invention, limited only by the scope of the appended claims.

SUMMARY OF THE INVENTION

In accordance with the present invention, a directory display and configurable entry system is preferably provided with a modular architecture, and arranged having a user interface portion based on an intuitive multi-page graphical user interface (GUI). The GUI of the invention is specifically arranged to enable a user to readily access occupant related information that is contained in a preferably locally established and maintained database of the invention. The accessing of the database, and occupant related information contained therein, is realized by the user typically making a small plurality of selections. The selections ultimately provide contact related information to facilitate an attempt at contacting and preferably meeting with an occupant of a location at which the present directory display and configurable entry system is installed and operated.

The modular system architecture provides for the inclusion, when needed, of one or more relay interface modules. Each relay interface module may be remotely located from a computer unit of the system, with an operative coupling established between the relay interface module and the computer unit. The relay interface module is structured for enabling new and or legacy devices and sub-systems to be coupled to the hardware of the present directory apparatus, including the computer unit and sub-systems thereof. Each included relay interface module is structured for generating a plurality of control signals, as well as possibly sensing a plurality of input (external closure) signals. For example, the control signals may be coupled to audio sounders and door strikes, while input signals may come from momentary pushbuttons and or magnetic door switches.

BRIEF DESCRIPTION OF THE DRAWINGS

In the drawings, like elements are assigned like reference numerals and designations. The drawings are not necessarily to scale, with the emphasis instead placed upon the principles of the present invention. Additionally, each of the embodiments depicted are but one of a number of possible arrangements utilizing the fundamental concepts and features of the present invention. The drawings are briefly described as follows:

FIG. 2 depicts a somewhat simplified high-level block diagram of a first possibly preferred embodiment of the directory display and configurable entry system of the invention.

FIG. 3 is a high-level block diagram of a second possibly preferred embodiment of the present invention.

FIG. 4A provides a block diagram of an embodiment of a relay interface module that may be operatively coupled to a computer unit, and possibly remotely located at a distance from the computer unit.

FIG. 4B depicts a modular embodiment of the directory display and configurable entry system including a computer unit executing an application program and having the database established therein, with the computer unit operatively coupled to a plurality of included relay interface modules, which may be connected or coupled in a daisy chain configuration.

FIG. 5 depicts a possible first GUI page that may be termed a welcome page, which is displayed upon the display screen of an embodiment of the directory display and configurable entry apparatus of the invention.

FIG. 6 depicts a next page, termed a partitioned occupant listing page, which may be displayed upon a selecting (clicking or tapping) upon the welcome page. This page is preferably partitioned having at least a first portion and a second portion.

FIG. 8A depicts the occupant contact page superimposed over a partitioned occupant listing page, with the occupant contact page being displayed as a result of the user selecting the occupant 'Carlos Vega' (e.g., clicking or tapping) from the list of occupants presented to the user in the second portion of the partitioned occupant listing page of FIG. 7.

FIGS. 8D and 8E provide yet other pop-up pages that may be provided to a user to prompt the user to pickup an available handset when commencing a call to attempt to contact an occupant of interest.

FIGS. 10A, 10B, and 10C depict a series of possible pages (several shown as superimposed pop-up windows) available for causing a contacting of emergency entities with a predetermined minimal number of user selections needed.

FIG. 11 depicts a simple example of a pop-up page that has been displayed for pizza restaurants as a result of a user selecting the 'Pizza' item from a list of possible off-premises entities displayed in the second portion of a provided off-premises listing page.

FIGS. 12A through 12C provide a series of pages that may be presented to a user when installing and configuring the directory display and configurable entry system of the invention for use at a specific location.

PARTIAL LIST OF REFERENCE NUMERALS

Figure 1:
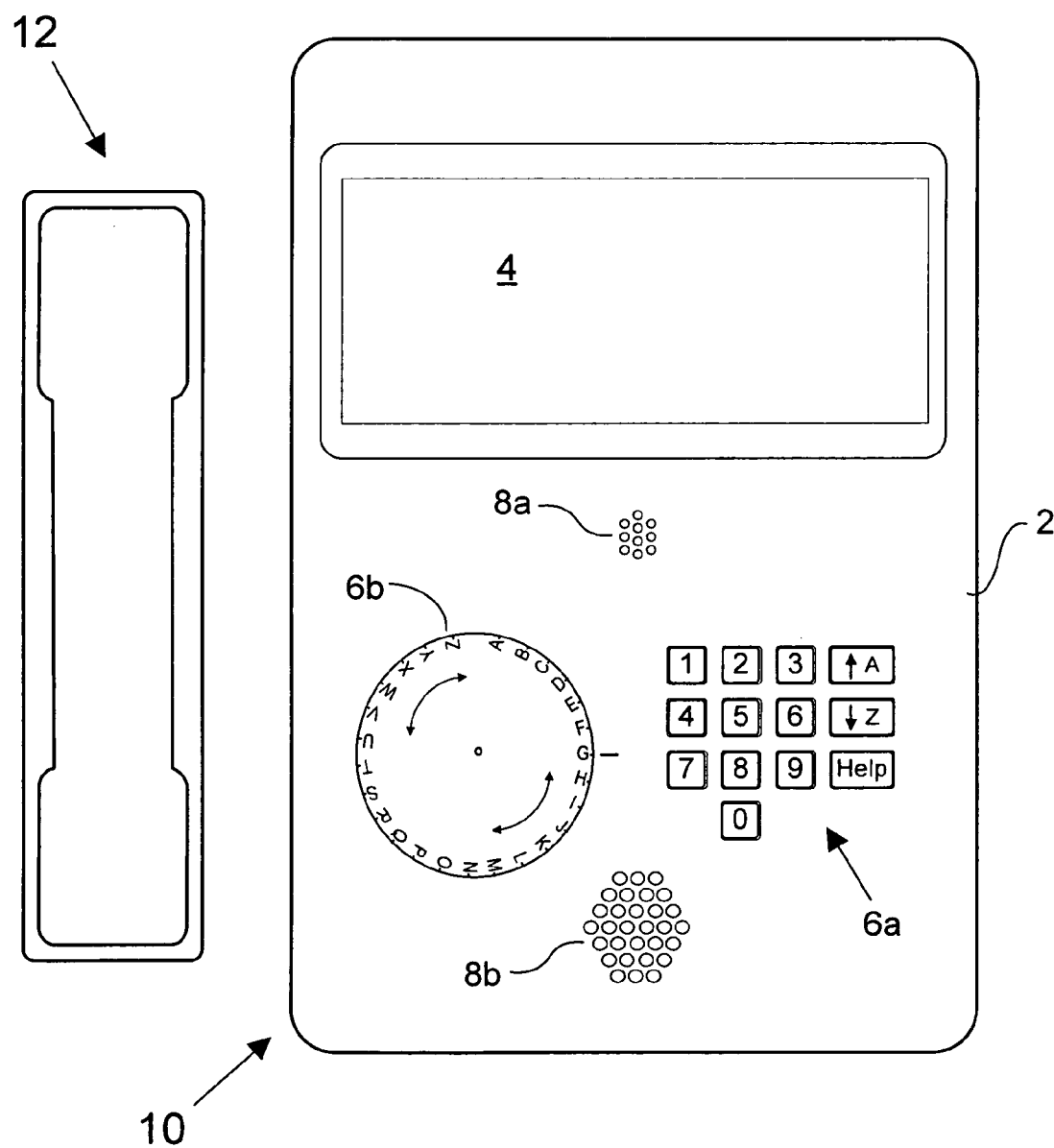
FIG. 1 provides a front view of a case and user interface consistent with prior art directory display units, including those providing telephone entry functions.

2—housing shell
2*a*—front panel (of 2)
4—display or display screen
6—generalized mechanical user input devices
6*a*—pushbutton keypad and direction keys
6*b*—rotary encoder (dial)
8*a*—microphone
8*b*—speaker
10—traditional telephone contact/entry apparatus
12—telephone handset
28—remote management console
30,30*a*—directory display and configurable entry system
32—multi-line display or display unit
34—point/select means
36—microphone/speaker (audio modules)
40—user interface
42*a*—electrical sensing signals (inputs)
42*b*—electrical control signals (outputs)
50—computer
50*a*-50*e*—operative couplings
52—Database
54*a*—communication port (of 50)
54*b*,54*c*—communication ports (of 100)
56—modem/communication interface
58—application program
60—coupler
64—subscriber communication service
68—local handset (or equivalent)
90—wireless communication module
90*a*—remote wireless communication module
94—local antenna
94*a*—remote antenna
100—relay interface module
100*a*—controller based relay interface module
100*aa*—wireless relay interface module
104—actuators/relay module
106—address setting switches
110—control module
110*a*—contact sensing inputs
112—signaling device
114—communication modules
116*a*,116*b*—communication buses/couplings
118—electronic door striker module
150—welcome page (with textual information)
154—first textual item of welcome page
158—textual user prompt
160—partitioned occupant listing page
162—residents tab
164—first portion (of 160)
164*a*—jump tags
166—second portion (of 160)
167—tabs portion
168—top or title banner (of 160)
168*a*—address of location (shown in 168)
170—occupant contact page (basic)
170*a*-170*e*—occupant contact pages (alternates to 170)
174*a*—contact icon
174*b*—cancel icon/button
178*a*-178*c*—contact icons
180—emergency listing page
182—emergency tab
184*a*—emergency contact icon
190—off-premises listing page
192—off-premises tab
200—first configuration page
206—general settings box
208—slide-show welcome page settings box
210—holiday-themed welcome page settings box
210-1—holiday-theme configuration sub-page 1
210-2—holiday-theme configuration sub-page 2
212—holiday-themed image sub-page select icon
214*a*—edit contact data sub-page select icon
214*b*—other settings select icon
220—database occupant editor sub-page
230—listing of occupant records

252—database records (generalized)
252*a*—i−1 database occupant record
252*b*—ith database occupant record
252*c*—i+1 database occupant record

DETAILED DESCRIPTION OF EMBODIMENTS OF THE INVENTION

Before providing a detailed description of the preferred embodiments of the invention, along with preferable constituent components of these embodiments, it is important to establish the definition of a number of descriptive terms and expressions that will be used throughout this disclosure. The term 'location' is to be broadly defined, with a location typically being of interest by one or more individuals due to the need to contact and or visit one or more occupants of the location. For example, a location may be a building, a floor of a building, a partitioned suite of rooms on a floor of a building, etc. Further, locations may be fixed, as well as mobile, and may be more generally defined as mobile structures, vehicles and or vessels. In addition, a 'location' may be utilized for private, commercial, governmental, military, and or other known enterprises and functions. Typical installation sites for the present invention may include multi-story and or multi-family residences, large corporate or business locations, etc. Essentially, the present invention may be employed at any location needing to provide efficient and ready access to a database containing pre-established occupant related information. Accordingly, the term 'occupant' is also to be broadly defined and may be assumed to be a business owner, an employee, a resident, a landlord, a tenant, a government office or entity, a government worker, etc. Generally speaking occupants are associated with the location of installation and operation. The expression 'graphical user interface', or GUI, when applied in the context of the present invention, may be assumed to describe a preferably intuitive multi-page or multi-level user interface that is presented upon a display unit. A 'display unit' may be assumed to be any device suitably structured to present information, including graphical and textual information, for viewing by a user. The graphical user interface of the present invention is specifically structured to enable a user to access a database, preferably locally located, containing information including 'occupant related information'. As such, occupant related information may be contained in database items, such as a record, an occupant record, etc. Each of these items, which may be considered to be equivalents, may be composed of a plurality of sub-items, which will be termed fields. Accordingly, the database will include a plurality of records, with each having a plurality of fields. Each occupant record is provided to house information associated with an occupant of the location. In addition, the displaying of occupant related information, upon one or more of the pages presented to a user, may involve a displaying of only a pre-selected subset of the fields that compose the occupant record—possibly in a listing form. An important goal of the present invention is to provide a means and method for readily accessing occupant related information, and if the system is so configured, ultimately providing at least one contact icon (or electronic button) that may be selected to contact an occupant of interest at the location at which the present directory display and configurable entry system is installed and utilized. The terms 'icon' and 'iconic symbol' may be considered equivalents. It may also be noted that the expressions 'directory display' and 'directory display apparatus', when combined with other aspects of the present invention, provide a 'directory display and configurable entry system' that is modular and configurable, and may be utilized at new construction locations, as well as existing sites that are being updated or renovated. The term 'user' may be assumed to be an individual needing to contact an occupant of the location, and may include a visitor, another occupant, a building employee such as a door-person, a building security individual, a concierge, etc. The term 'select' or 'selected' will be used throughout this disclosure to indicate that a user has provided an action resulting in a selection of an item or items displayed via the GUI. Such a selection may be made by using a well known 'point and click device', such as a mouse, touchpad, trackball, etc. Alternately, if the system employs a 'touch-sensitive screen', the user may directly tap upon the displayed item or region to effect a selection. The terms 'coupled', 'operative coupling', 'functionally coupled', and equivalents thereto, will be employed to broadly indicate that two or more units are interconnected either directly, or by one or more intervening components. In addition, an operative coupling may involve a simple arrangement, for example, employing one or more simple electrical wires or signals. Alternately, other 'operative couplings' may employ, for example, communication channels wherein a serial or parallel data transfer mechanism is provided, possibly employing specialized hardware and software means and methods. Other important terms and definitions will be provided, as they are needed, to properly define the present invention and its associated novel characteristics and features.

Referring now to the drawings, FIG. 2 provides a somewhat simplified high-level block diagram of a first preferred embodiment of a modular directory display and configurable entry system 30 of the invention. As shown, a user interface 40 may include a suitable display device, preferably a multi-line, possibly large format, and or graphics capable display unit 32. The display unit 32 is provided for displaying pages of a multi-page graphical user interface (GUI) enabling the user to efficiently and readily access information, including occupant related information, stored in the form of occupant records of a database 52. The occupant records, and a variety of possible fields thereof, will be discussed in detail hereinafter when referring to FIGS. 13A-13C. Importantly, each of the occupant records is arranged containing occupant related information associated with one or more occupants of a location at which the directory display and configurable telephone entry system is installed and utilized. The user interface 40 may also include a point/select device 34 that is included to enable the user to make 'selections'. Additionally, a microphone/speaker module 36 may be included for functions including enabling hands-free conversation to be supported between the user and an occupant of the location. As shown in FIG. 3, the microphone/speaker 36 of FIG. 2 may be arranged to provide the function of a speaker phone 36*a*, with a handset 12 either alternately or supplementally provided.

Returning to FIG. 2, the user interface 40 is preferably operatively coupled to a computer unit 50 for enabling information to be exchanged between the user interface 40 and the computer unit 50. As shown, the operative coupling 50*a* is provided for this purpose, and may be provided as a hardwired or wireless coupling. Regardless of the actual operative coupling employed, the information exchanged over the coupling may include occupant related information presented to a user (e.g., from the database 52), as well as predefined textual and graphical content. Additionally, the operative coupling 50*a* will enable user provided information, including user 'selections', to be received by the computer unit 50. It may be noted that the computer unit 50 may most preferably be provided by a self-contained and somewhat compact computing device/unit. For example, several most preferred embodiments of the invention may be structured with a computer unit 50 provided by a desktop personal computer (PC), a portable personal computer, a tablet computer, etc. However, it must be noted that differing and alternate embodiments of a computer unit 50, including those based on embedded controller architectures, are certainly possible and contemplated as being within the scope of the present invention. For example, field programmable logic devices (FPLDs), including custom and semi-custom devices, may be utilized with controller or processor cores. Indeed, for very large production runs, system-on-chip (SOC) embodiments may prove to be most preferred.

Regardless of the actual computer unit 50 architecture employed, a storage sub-system of the computer unit 50 may be provided and structured for functions including holding, accessing, and as required updating the database 52 containing occupant related information. As will be discussed hereinafter in detail, portions of the occupant records in the database 52 will be presented to a user by way of the user interface 40.

As understood by skilled persons, the storage sub-system of the computer unit 50, which may be structured with common off-the-shelf storage devices providing volatile and non-volatile storage, may also be employed to hold an application program providing the operational functionality of the directory display and configurable entry system 30. The functionality may preferably include presenting information to the user, accepting user selections, and responding to user selections with pre-defined actions and responses. A number of examples will be provided hereinafter.

Returning again to FIG. 2, the computer unit 50 may preferably be further structured with a modem/communication interface 56, suitable communications ports, such as communication port 54a, and any other needed interfaces and interconnect means—which are included for coupling internal sub-systems and components, as well as peripheral devices, to the computer unit 50. As shown in FIGS. 2 and 3, the modem/communication interface 56 may preferably be employed for, among other functions, coupling the present invention to a subscriber communication service 64, as well as a local communication device, such as the handset 68 or speaker phone 36a. Such a coupling is included for enabling audio information to be received and transmitted upon the subscriber communication service for contacting and communicating with an occupant, as well as delivering portions of the audio information to the user. For example, such audio information may include a brief conversation between a user (visitor) and an occupant of the location—even while the occupant is not physically located at the location.

Accordingly, the modem/communication interface 56 may be included for enabling the computer unit 50, under control of an application program thereof, to attempt a contacting of an occupant. For example, by placing a call to a communication device of an occupant of interest that has been selected by a user by way of the graphical user interface of the invention. It may be noted that the modem/communication interface 56 may further be configured for providing access to the database 52 from a remote location. Accordingly, an operative coupling 50b or 50c, which may be best provided by a serial communication channel, may be employed to couple a remote management console 28 to the computer unit 50 for accessing and updating the occupant related information, and other possible records and fields of the database 52.

As understood by skilled persons, alternate embodiments of the directory display and configurable entry systems 30/30a, and equivalents thereto, may involve using a wide area network (WAN) or local area network (LAN) architectures to access one or more subscriber communication services. In such cases, embodiments may include one or more wired and wireless communication interfaces. Regardless of the actual services or interfaces employed, the coupling of the computer unit 50 to such services is needed to support an attempting to contact an occupant by establishing a communication link between an occupant of the location and the user of the directory display and configurable entry system 30, preferably enabling them to communicate (e.g., speak) with each other. In a possibly most preferred embodiment a coupler 60 couples a modem/communication interface 56 of the computer unit 50, a local handset 68 (that is readily available to the user), and the subscriber communication service 64, such as an analog or digital telephone line service—as clearly illustrated in FIG. 2 and FIG. 3.

Another important aspect of the present directory display and configurable entry system 30/30a is the availability of a relay interface module 100. As illustrated in FIG. 3, this module may be included with embodiments of the invention when the need arises to interface external devices, such as audio/visual signaling devices 112 and electric door strike modules 118, to an embodiment of the directory display system 30/30a. As shown, the relay interface module 100 may most preferably include actuators and relays 104 for driving electric control signals 42b, as well as a contact sensing means 110a for receiving electrical sensing signals 42a (as shown in FIG. 2). One possibly most preferred embodiment of the relay interface module 100 may be provided as a controller based module 100a, which will be discussed further when referring to FIGS. 4A and 4B.

It is important to note that the inclusion of one or more relay interface modules 100 or 100a enables embodiments of the directory display and configurable entry system 30/30a of the present invention to be provided with a modular and expandable architecture. The modular architecture enables the user interface 40 to be located at a distance from the computer unit 50. In addition, the computer unit 50 may also be located a distance from any included relay interface modules 100/100a. As such, the present invention is fully configurable, and even more notably, quite scalable. Accordingly, embodiments may be structured with a single user interface 40, and possibly include a relay interface module 100, as depicted in FIG. 2. Alternately, more complex embodiments may be provided, wherein a plurality of user interfaces 40, possibly quite a distance apart, may be included, as well as a plurality of relay interface modules 100/100a (see FIG. 3). This latter embodiment will be well suited to larger locations, possibly having a plurality of entrance-exit doors.

Referring again to FIG. 3, it is contemplated that embodiments of the present invention may certainly include wireless modules. For example, the computer unit 50 may be structured with a wireless communication module 90 coupled to a local antenna 94. The wireless communication module 90 and local antenna 94, when included, enable a communicating with a wireless relay interface module 100aa. Similarly, it may be necessary or convenient to provide a user interface module 40 that is operatively coupled to the computer unit 50 by way of a wireless coupling or interface (not illustrated). Again, the availability of wired and wireless components, such as relay interface modules 100, 100a, and 100aa, enhance the modular and configurable nature of the present invention.

Turning now to FIG. 4A, a block diagram is provided of a preferred embodiment of a controller based relay interface module 100. For convenience, when referring to module 100 in the context of this disclosure, the actual module employed may be a module 100, 100a, or 100aa. Further, when included with embodiments of the directory display and configurable entry system 30/30a, a communication link may be established for operatively coupling a relay interface module 100 to the computer unit 50. Recall, the inclusion of one or more relay interface modules 100, enables the computer unit 50 of the directory display system 30/30a to be readily interfaced with other possible legacy devices in a convenient, low cost, and efficient manner. Importantly, the particular communication link employed between the computer unit 50 and a relay interface module 100 may be selected based on the specific installation, and may be based on the actual location and distance between the computer unit 50 and a respective relay interface module 100.

As shown, a control module 110, which may be termed a 'controller', is preferably coupled to sub-components by a suitable bus 116a. A bus 116a, and alternate means, enables any included communication modules 114 to be operatively coupled to the control module 110. The communication modules 114 are preferably structured to support the establishing of needed communication links to the various portions and or sub-systems of an embodiment of the directory display and configurable entry system 30/30a. As such, a communication module 114 may include items such as UARTs, USARTs, encoders, decoders, level shifting devices, etc. As a skilled individual will appreciate, the most preferred embodiments of the communication modules 114 may employ at least one serial interface channel. Alternately, a wireless module 90a and remote antenna 94a may be included and employed for exchanging information between units and modules of the relay interface module 100.

As further shown in FIG. 4A, the relay interface module 100/100a is preferably arranged for driving one or more output signals 42b (e.g., via electronic or mechanical contact closures), as well as possibly sensing external signals 42a (or inputs). As clearly illustrated in FIG. 4A, a plurality of the signals 42b may be driven directly by the control module 110, and or possibly driven by way of electronic or mechanical switches (e.g., relays). For example, as illustrated in FIG. 4A, one or more relay modules 104/104a may be included and coupled to the control module 110 for controlling signals 42b. It is also contemplated that the relay modules may be provided with fixed polarity output signals 42b, as with relay module 104, and or with configurable polarity output signals, as with relay module 104a. Further, the relay modules 104/104a may be operative coupled by way of bus 116a (not illustrated), a separate second bus 116b (as illustrated), or via other available methods and approaches. Also, one or more COM (common) terminals, as shown in FIG. 4A, may be provided for return signals. Importantly, the relay modules 104/104a, and equivalents thereto, are included for coupling the directory display and configurable entry system 30/30a to external devices such as sounders, signalers, electric door strikes, garage door openers, gate opening mechanisms, etc.

As skilled persons will appreciate, the relay interface module 100 of FIGS. 4A and 4B, may be substantially provided by a single electronic device, such a specialized microcontroller or programmable logic device. As such, the buses 116a and 116b, as well as all or portions of any included communication modules 90a and 114, and relay interface modules 100/100a. If a microcontroller device is provided, it may be structured as a substantially single chip device, including a processor, an on-chip memory, at least one communication interface module, along with a plurality of: analog inputs, digital inputs, and or digital outputs. The on-chip memory may be arranged containing the application program enabling, among other activities (as discussed above), the exchange of command/status information between the computer unit 50 and included relay interface modules 100.

As shown in FIG. 4A, an address setting switch 106, for example provided by a miniature dual-in-line maintained switch device, may be coupled to the control module 110. The address switch 106 may be set to a unique 'address', which enables the computer unit 50 to employ a single operative coupling 50d (e.g., a serial communication channel) to send commands to a plurality of relay interface modules 100, with the commands affecting only certain (addressed) relay interface modules 100, based on the address transmitted with an issued command or a status request.

As illustrated in FIG. 4B, another possible arrangement for coupling included relay interface modules 100 is to employ a 'daisy chain' arrangement. As shown, information flows from the computer unit 50 by way of communication link 50d to module #1. An output (O) from Module #1 is coupled to an input (I) of module #2 by way of communication link 50e, and so on. This arrangement enables a large number of relay interface modules 100 to be included—determined essentially by the range of addresses that may be set on the address switch 106 of FIG. 4A. When a serial communication link is employed, which requires a minimal number of conductors or a simple wireless link, it is possible to space the relay interface modules 100 apart. For example, an installation may require the running one long cable to a first module 100, and them employing substantially shorter cables to a cluster of nearby modules. For example, the computer unit 50 may be positioned near a lobby of a location, where the user interface 40 is installed and utilized. Therefore, the computer unit 50 may be positioned to minimize the length of cable needed to establish the operative coupling to the user interface 40. However, there may be a need to couple the computer unit 50 to drive and sense signals that are located in a utility closet (not near the lobby), or in a basement level. The architecture of embodiments of the present invention will easily handle these design requirements.

When interfacing to legacy equipment previously installed at a location, any included relay interface modules 100 may be arranged to appear to the computer unit 50 as a plurality of addressable electronically controlled switches. An 'address' of an electronic switch may be comprised of several components, including a board number, as well as a switch number (on the respective board). For example, suppose each relay interface module 100/100a provides 32 addressable contact closures (relays). Further suppose there are 70 contact closures necessary for an installation and embodiment deployed thereat. For example, to activate a sounder in each of 70 apartments of a multi-family building. In this situation, a protocol may be established including a board number (say 1 to 16) and a relay switch number (say 1 to 32). Therefore, a maximum of 16 times 32, or 512, switches may be individually addressed. In addition, if extra address bits where provided, or if several unused addresses are available, commands may be sent that may cause all electronic switches to be closed or opened (by transmitting a single broadcast command).

Returning briefly to FIG. 4B, it must be understood that a single direct communication link 50d may be established to operatively couple a plurality of relay interface modules 100 to the computer unit 50, or as illustrated and discussed herein a daisy chain or sequential coupling (as implied in FIG. 4B) may be utilized. As such, differing interface techniques may be employed based on how close or faraway a respective relay interface module 100/100a is from the computer unit 50. It may also be noted that by utilizing additional mechanical switches or jumpers, or electronically configurable circuit devices, the outputs of a relay interface module 100 may be configured for a required polarity or default state. For example, if mechanical jumpers (shorting blocks) are employed with single-pole-double-throw (SPDT) relays that provide both normally-open and normally-closed contact sets, then a user configurable output polarity or default state may be provided. Accordingly, when a relay interface module 100 is being installed an installer may configure the contact closure outputs for normally-open or normally-closed operation, as needed by the respective installation. An alternate arrangement is certainly providable using electronic or non-mechanical electronic structures for configuration. For example, an installer may utilize an additional setup page of the graphical user interface of the invention, either by way of the user interface 40, or an alternate setup/configuration console (not illustrated). Accordingly, regardless of the actual implementation, it is contemplated that groups of outputs, and or each individual output, which are controlling the electrical control signals 42b of a relay interface module 100, may be configurable to be one of either normally-off or normally-on when not being activated. In addition, it is certainly possible to configure the control module to cause each output coupled to an electrical control signal 42b to be activated for a pre-determined time interval, and then de-activated upon the expiration of that time interval. For example, if relay interface module #2 is sent a command from the computer unit 50 to activate electronic switch #9 (not explicitly shown), the associated electrical control signals 42b may be activated for some pre-determined length of time, and then de-activated by the control module 110. The deactivation may preferably be effected without the need to issue another (second) command from the computer unit 50 to de-activate the electrical signal(s).

Referring now to FIG. 5 through FIG. 11, a detailed description of several of the most preferred embodiments of a multi-page graphical user interface of the invention will be presented. The multi-page graphical user interface (GUI) is arranged for enabling a user to readily access a database containing occupant related information for occupants of a location. Essentially, the multi-page GUI and associated hardware may be considered a 'front end' or human interface to the directory display and configurable entry system 30/30a of the invention. Importantly, the occupant related information is stored in the database 52, a pre-established database containing occupant information, which is preferably established and supported upon the local computer unit to which the display device is operatively coupled. As will be discussed in great detail hereinafter, the information is presented by way of the GUI by employing a plurality of pages (and or sub-pages) presenting both jump tags, occupant listings, and contact icons—all of which are selectable by a user of the multi-page graphical user interface.

Turning to FIG. 5, there is depicted therein what may be considered a greeting or welcome page 150 of the graphical user interface. If included, the welcome page 150 may be composed of several items. For example, a greeting phrase and address 154 of the location at which the graphical user interface is utilized may be somewhat prominently displayed (shown on the top center of the welcome page of FIG. 5). A welcome graphical image may be provided by a pre-selected graphical image, and displayed either full page or in a frame or window covering a portion of the display screen. The welcome page 150 is contemplated to be generally displayed when the graphical user interface is not being used for a predetermined temporal interval (say 10 to 30 seconds).

As appreciated by skilled persons, the graphical images may be fixed, say showing a view of the location, or a pleasant scenic view. Alternately, the graphical image or images may be selected, or activated due to an approaching holiday or holiday season. In a possibly most preferred arrangement, the hardware of the computer unit 50 may support embodiments employing a 'slide show' format, with each image of a pre-selected plurality of images sequentially displayed, one after the other, for a pre-defined time interval or period. Additionally, the plurality of images may be changed to an alternate plurality of images, based on calendar dates or intervals. As such, different pluralities of graphical images may be selected based on the Season of the year or an occurrence of a holiday period.

Returning to FIG. 5, a prompt may be provided to a user indicating a required user action. For example, as shown in FIG. 5 a textual prompt 158, such as "Touch Screen To View Directory", may be presented to a user. Accordingly, this textual prompt hopefully will clearly indicate a required user action that is needed to begin to access occupant related information, which may be utilized for reaching and or contacting at least one occupant of the location. For the preferred embodiment illustrated in FIG. 5, wherein a touch-screen display unit is employed, when the user touches any portion of the display screen surface, a partitioned occupant listing page 160 of FIG. 6, or an equivalent, may be displayed. If displayed upon a non-touch screen display unit, the prompt may suggest 'clicking' upon any portion of the displayed image. It may be noted that the partitioned occupant listing page 160 may be logically partitioned, as shown in FIGS. 6 through 9, or physically partitioned, say using color coded or fully separate regions having one or more pronounced separations.

For embodiments wherein the welcome page 150 is not included, the partitioned occupant listing page 160 may in fact be the first page of the graphical user interface that the user views. If desired, written instructions may be provided, for example, mounted adjacent (e.g., above) to the display unit screen that is employed. Alternately, an additional portion of the occupant listing page 160 may be allocated for some help or guidance (not illustrated). For example, a one or two line region of help text may be provided, say above the title banner 168.

Figure 7:
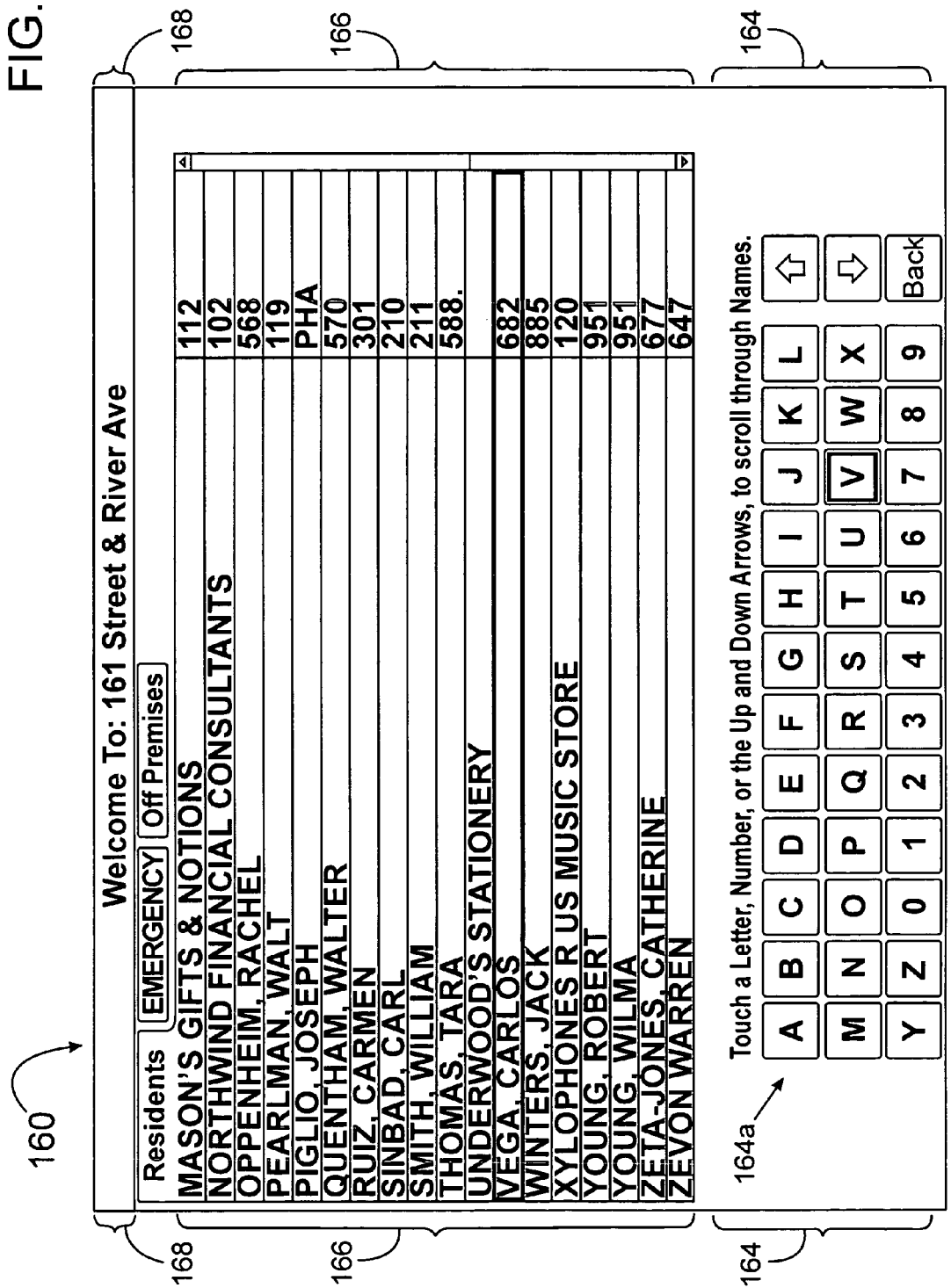
FIG. 7 depicts a partitioned occupant listing page after the jump tag for 'V', which is presented to a user in the first portion, has been selected for causing a direct displaying of one or more occupants that start with the letter 'V' (e.g., Carlos Vega as depicted)

Returning to FIG. 6, there is presented therein a partitioned occupant listing page 160 that is comprised of a plurality of portions. The portions include a first portion 164, a second portion 166, and possibly at least a one line title banner 168. The first portion 164 of the occupant listing page is most preferably arranged with a plurality of predefined jump tags 164a. The jump tags 164a may be provided as iconic symbols. For example, when considering the preferred embodiment of FIG. 6, the iconic symbols may be provided as the letters of the alphabet, the numbers from 0 to 9, and at least two direction indicating iconic symbols. Other arrangements and differing jump tags 164a are certainly possible. For example, each iconic symbol may not be a single letter of the alphabet, but may instead be associated with a range of letters (e.g., A-D, E-I, etc.). Regardless of the specific characteristics and configurations of the jump tags 164a provided, the jump tags will provide a means to readily access a sub-portion of the database 52, which is presented in the second portion 166. Accordingly, second portion 166 of the partitioned occupant listing page 160 may be termed an 'occupant listing portion'. As can be seen in FIG. 6, when the partitioned occupant listing page 160 is first presented or displayed, an initial subset or sub-portion of records of the database 52 is displayed by default. Next, a user may select (e.g., tap or click upon) a jump tag 164a, and rapidly and readily move to another portion of the database content. For example, considering FIGS. 6 and 7, the user is initially presented with the first alphabetically listed records of the database 52, as shown FIG. 6. Upon a selecting of the 'V' jump tag 164a of first portion 164, a second subset of records is presented within the second portion 166 of the partitioned occupant listing page 160. For the example illustrated, it may be noted that the preferred listing arrangement may actually, where possible, place the first listing associated with a jump tag 164a, in the middle of the second portion (as depicted in FIG. 7). It may be noted that the direction jump tags may be selected at any time, and may be configured to provide single up or down steps through the occupant listings of the database 52, or alternately 'page' up/down with each direction key selection.

It may also be noted that when multiple occupant record listings (lines) are displayed, residential occupant record listings may be distinguished from business or professional occupant record listings. For example, a bold font may be used for non-residence listings. Other approaches may include using color-coded fonts, using fonts of differing font types or sizes, or any visual difference that accentuates one type of listing from others.

Figure 8B:
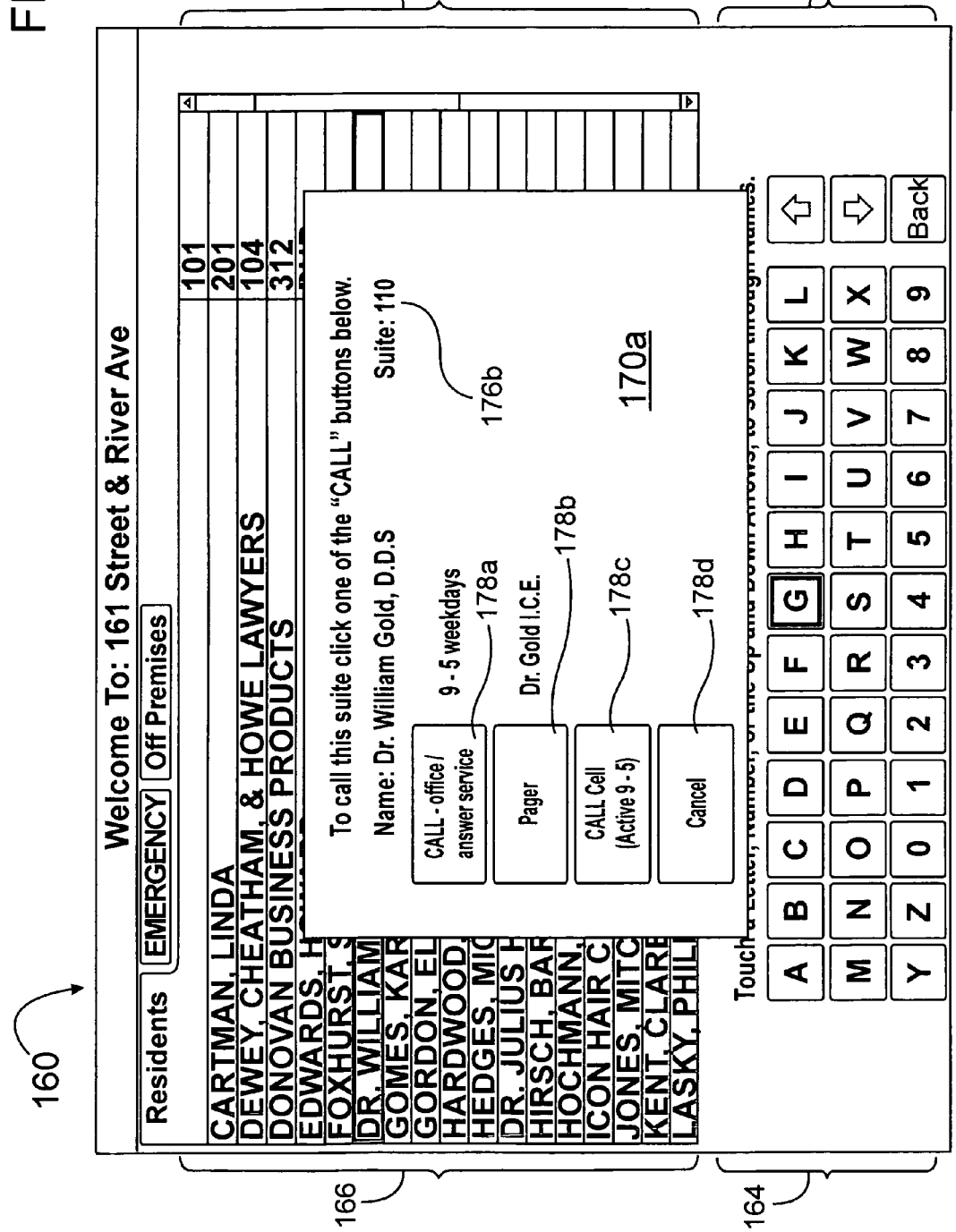
FIG. 8B provides another example of an occupant contact page, which is provided as a pop-up window, depicting a professional occupant having three contact icons, wherein each is available for selecting to attempt a contacting of the occupant.

Returning to FIGS. 6 and 7, once an occupant record has been located and is displayed in the second portion 166 of the occupant listing page 160, it is available for 'selecting'. Once an occupant listing of interest is selected, an occupant contact page is displayed and presented to a user. An example of one possible embodiment of an occupant contact page 170 is shown in FIG. 8A. This is just one available arrangement for presenting occupant contact pages. For example, as depicted in FIGS. 8A and 8B, the occupant contact page 170 is provided as a pop-up window, which covers at least a portion of the first portion 164 and or the second portion 166 of the occupant listing page (as shown), and is not a full screen or full sized page, as it was with the welcome page 150 and the occupant listing page 160. Alternately, embodiments of the occupant contact page 170 may be displayed by replacing either of the first or second portions of the occupant listing page. Other arrangements for presenting the occupant contact page 170 are certainly possible, and are contemplated as being within the scope of the presently claimed invention.

Returning to FIGS. 8A and 8B, the occupant contact pages 170/170a depicted may include at least one contact icon. When considering the occupant contact page 170 of FIG. 8A, a single contact icon 174a is presented to the user for the occupant of interest of the location. The user may simply, with a single user action, commence an attempting of a contacting of the respective occupant—without the user knowing any actual contact information of the occupant (e.g., telephone number, room number, floor number, etc.). When privacy is not an issue, and as shown in FIG. 8B, the occupant contact page 170/170a may provide information including an indication 176b of a suite, office, or apartment number of the occupant. Also, a cancel icon 174b/178d, as shown in FIGS. 8A and 8B, may most preferably provide for enabling a return to the previously displayed occupant listing page 160. Accordingly, a cancel icon operates much like the ubiquitous 'back' icon/button.

Importantly, the selecting of a presented contact icon may cause one or more possible actions to occur. For example, possible actions include placing a call to a wired communication device of the occupant located within the location. Such a communication device may be a sounder (e.g., a buzzer), a visual signaling device (e.g., a flashing light), and or a wired voice communication device (e.g., a telephone). Generally each of these devices would be located within the location of installation and operation. Alternately, one or more contact icons may cause a placing of a call to a wireless communication device of the occupant—thereby enabling a contacting of the occupant by way of the wireless communication device whether the occupant is at the location or elsewhere.

It may be noted that several other features may be employed when permitting or blocking a contacting of the occupant. Factors such as the time of day, or the day of the week may be considered. For example, as shown in FIG. 8B, the first contact icon 178a for Dr. William Gold may be configured such that a text message is provided indicating that a call may only be made during the hours of "9-5 weekdays". Alternately, contact icon 178a may be arranged to call the doctor's office only during the hours of 9 AM to 5 PM, with a call placed to an answering service during other hours. Similarly, when considering residential listings, calls to an occupant's residence may not be allowed, for example, before 6 AM and after 10 PM.

Figure 8C:
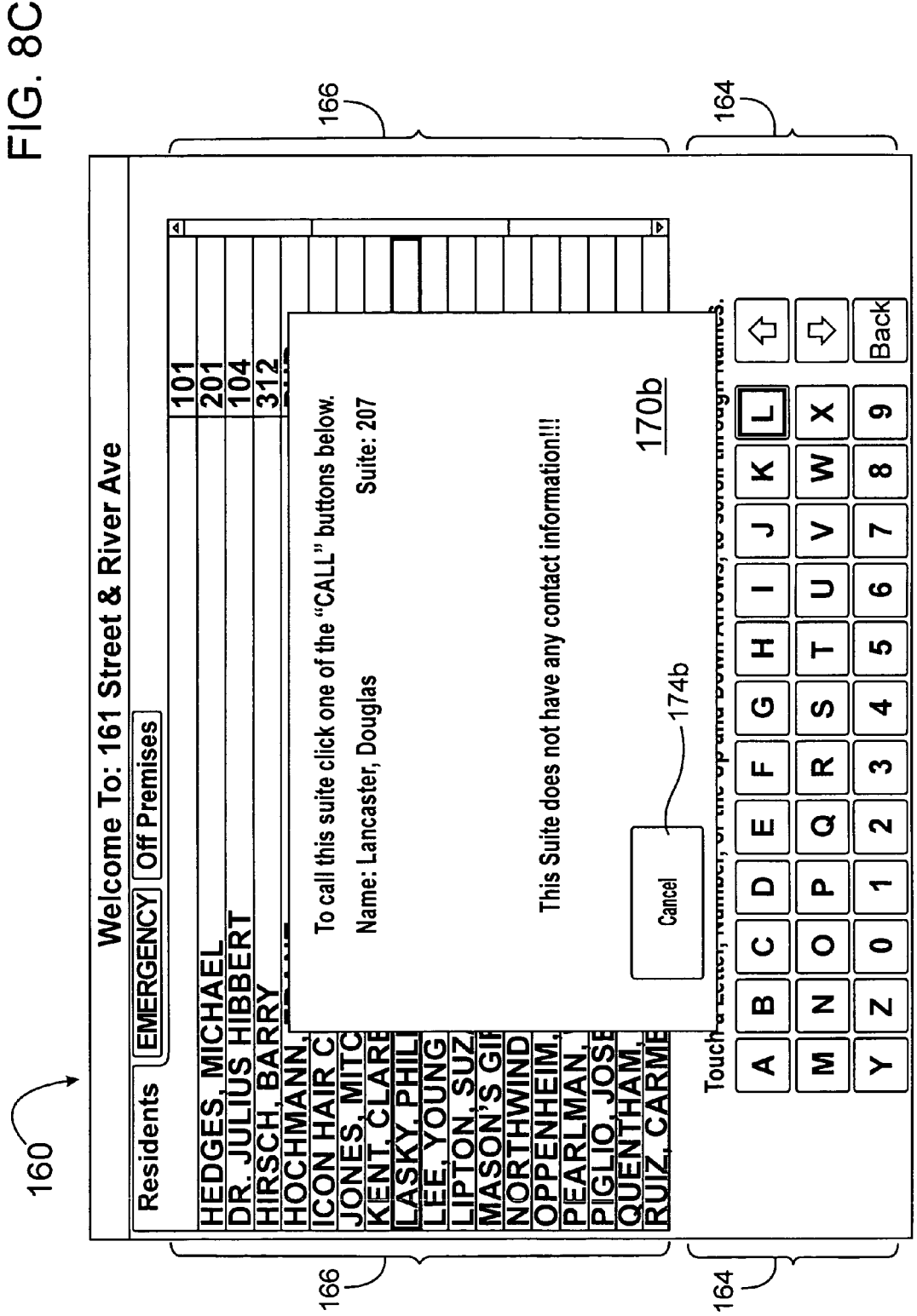
FIG. 8C provides an example of an occupant contact page wherein no contact icons are available.

It may be noted that a plurality of contact icons may be provided for an occupant, including a contact icon 178b to contact a pager, icon 178c to call a cell phone, etc. Further, it may be desirable to establish a sequence for attempting to contact an occupant. As such, several contact icons may not be available (say grayed out or not displayed), until a first contact icon has been used. Finally, as can be seen in FIG. 8C, an occupant contact page 170b may provide no contact icons or information. This may be preferred if an occupant does not want any directory contact access provided, or is away for an extended time period.

It may also be noted that an occupant contact page may alternately be arranged with information such as directions to a door of the occupant (not illustrated), instead of contact icons. This arrangement may be desirable, for example, in an office building wherein an occupant is open to the public and employs a receptionist.

Figure 8D:
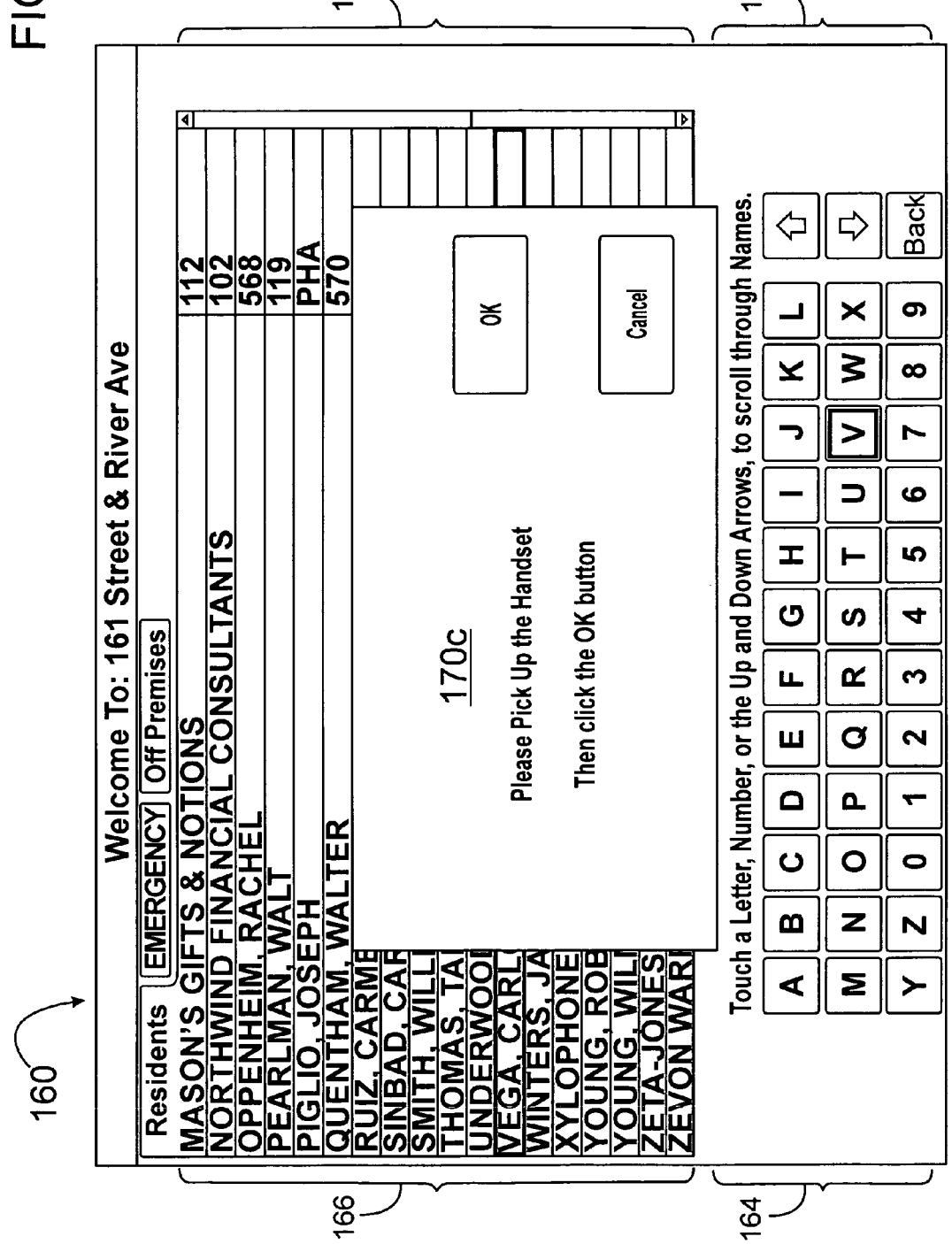

Turning to FIG. 8D, once a contact icon such as contact icon 174a or 178a is selected by a user, a prompt may be provided to a user, for example when a local handset is to be utilized. As shown, a user action prompting page 170c, or an equivalent thereto, may be presented indicating that an attempt at contacting the occupant of interest is in progress, and that the local handset should be picked up. A preferred status indicating page, such as page 170d of FIG. 8E may be provided, say when a speakerphone is being employed, or after picking up the local handset.

Figure 9:
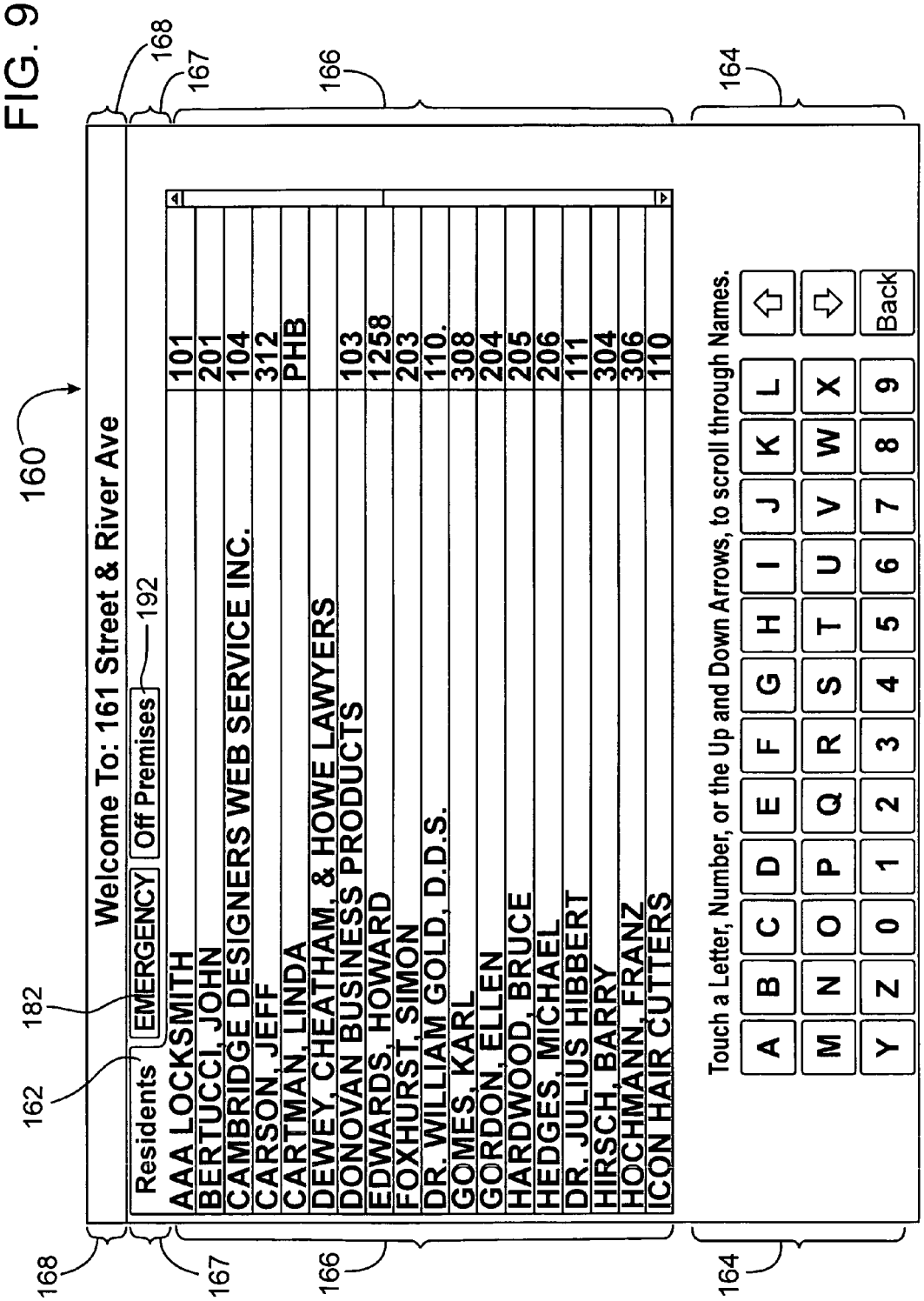
FIG. 9 depicts several other aspects of the partitioned occupant listing page including a plurality of page tabs for displaying other pages containing, for example, emergency contact information and off-premises businesses such as local restaurants and supper clubs.
Figure 10C:
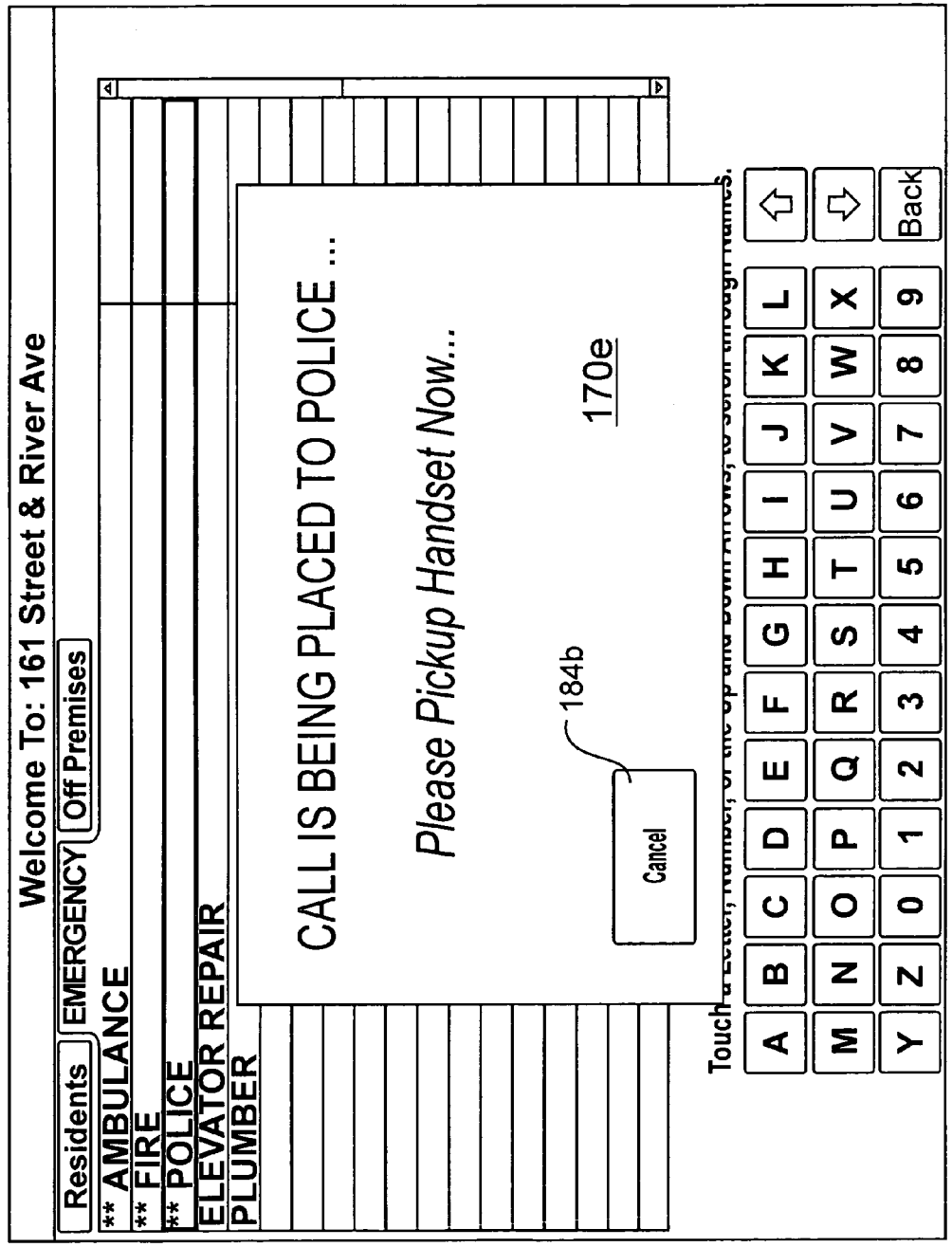

Referring now to FIG. 9, yet another aspect of the present invention will be discussed. As indicated in FIG. 9, a plurality of paging or page selecting tabs may be provided in a tabs portion 167 of the occupant listing page 160. As can be seen, the tabs depicted and available include the residence tab 162, an emergency tab 182, and an off-premises tab 192. Other tabs are certainly possible. When another tab is selected (other than the Residence tab), another specialized listing page is presented. For example, if the Emergency tab is selected, an emergency listing page 180 may be displayed, with the second portion 166 employed for possibly displaying a listing of possible emergency entities that can be selected for contacting. For example, if the listing of FIG. 10A is presented to a user, and the user selects **Police, a call may be immediately placed to a nearest or pre-defined police location, or as shown in FIG. 10B, a contact page 170d may be presented to user. A selecting of contact icon 184a, will cause a call to placed to the police, and possibly cause another page 170e of FIG. 10C to be displayed.

Returning to FIG. 9, another aspect of the invention calls for including an Off-Premises tab 192, which when selected will provide listings (as illustrated) or immediate contact means (not illustrated). The Off-Premises tab 192 is provided to enable quick and rapid contacting of one or more entities that are generally not occupants and often provide a service/product. For example, as depicted in FIG. 11, if the Off-Premises tab 192 is selected, followed by a selecting of the Pizza listing, a contact page 170f is presented. As depicted in FIG. 11, a plurality of contact icons may be presented for contacting any one of a plurality of pizza making entity. Note that the entities may be Off-Premises for the case provided. It is certainly contemplated that the embodiments of the present invention may be provided such that a user, say at a hotel or similar location, may contact both off-premises and on-premises listings using the displayed contact icons.

Accordingly, the multi-page graphical user interface or GUI of the present invention provides an intuitive multi-level, interface enabling a user to readily access information of a pre-established database of information, including occupant related information. However, it must be noted that other useful contact information, which may be useful during emergency situations or when the need arises to contact off-premises entities, may further be provided and available.

Figure 12A:
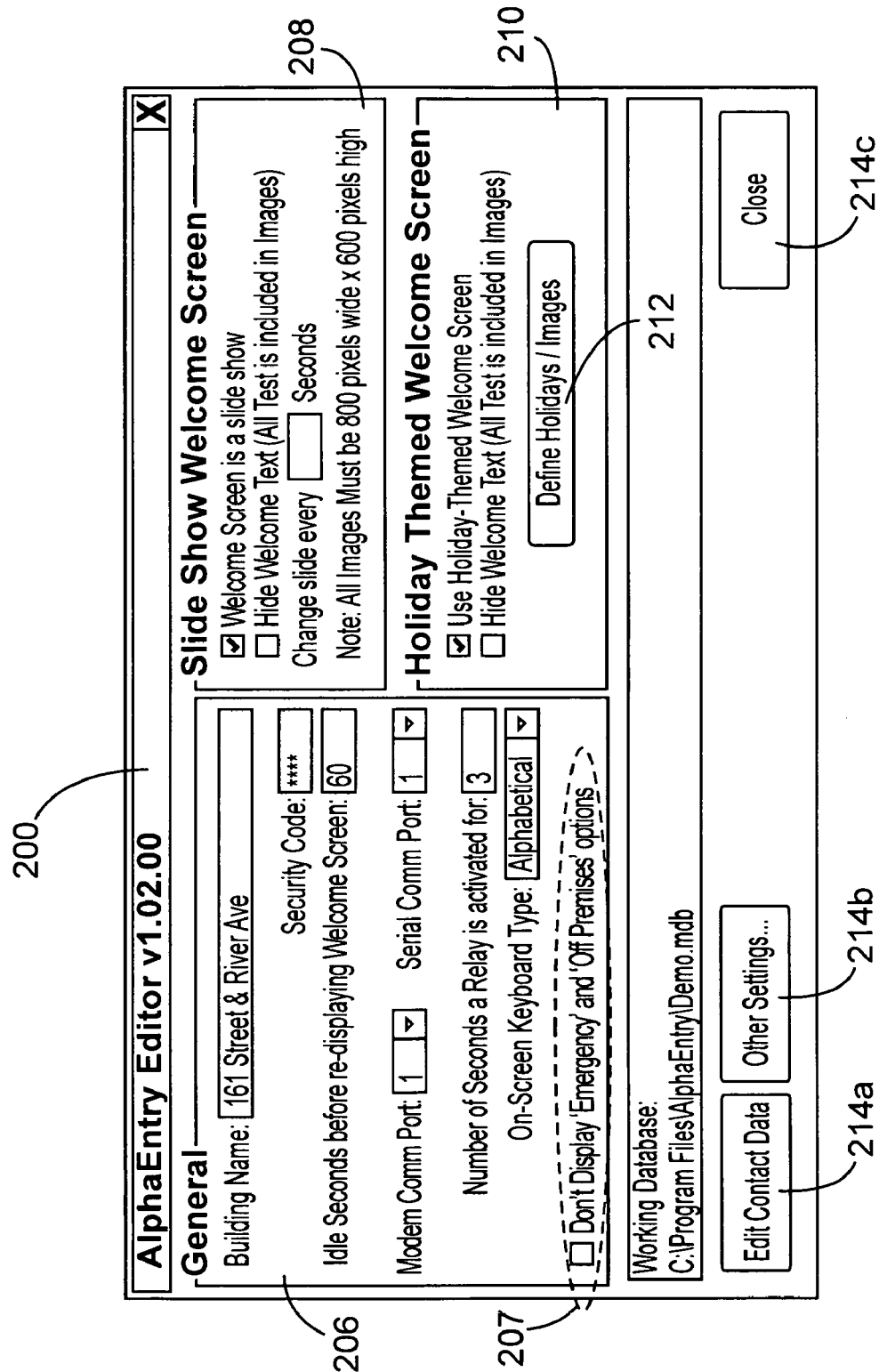

Turning to FIGS. 12A through 13C, a discussion of a possible configuration interface, and an example of a database containing occupant records, which is consistent with embodiments of the present invention, will not be presented. Due to the nature of directory display system 30/30a, as well as a need to input and provide updates to records and fields thereof stored in the database 52, it may be useful to enable the user interface 40 to be employed for such tasks. For example, as shown in FIG. 12A, a first configuration page 200 may be utilized. As can be seen, a 'General' box 206 may be provided in the upper left of the first configuration page 200. Box 206 may enable items such as the address, building name, as well as other basic settings, to be defined. For the embodiment of the first configuration page 200 depicted in FIG. 12A, a security code may be set, which is useful to enter into the 'setup mode'. That is, suppose the security code is set to 'ABCD'. Should an individual at the user interface 40 make the selections 'A', 'B', 'C', and 'D', say using the jump tags 164a of the first portion 164 of an occupant listing page 160, the directory display and configurable entry system 30/30a may enter a setup and configuration mode, possibly displaying a first configuration page 200.

As further shown in FIG. 12A, the first configuration page 200 may also enable a user to establish one or more holiday and non holiday time periods, say over days, weeks, or months, during which one or more pre-selected graphical images may be associated. For example, if a selection is made of the provided 'Define Holidays/Images' button 212, a configuration sub-page 210-1 may be presented (see FIG. 12B). As shown, a list of holiday and non-holiday records may be established. New records may be added, for example, by selecting button 210-1a, which may cause another configuration sub-page, such as sub-page 210-2 of FIG. 12C, to be displayed and made available to an individual that is configuring the invention.

It must be understood that the configuration pages and sub-pages of FIGS. 12A through 12C, are but one of many possible interfaces for enabling an individual to configure the present system. As such, their inclusion should not be considered limiting, but exemplary. In addition, a number of other configuration items and options are depicted, most of which have been explicitly or implicitly discussed. Yet others, such as the On-Screen Keyboard Type setting, the Don't Display 'Emergency' and 'Off-Premises' Options, and the various port settings, enable embodiments of the directory display system 30/30a to be customized, as needed.

Another important aspect of the present invention is the database 52, which is structured to house information including occupant related information for occupants of a location. As shown in FIG. 12A, an 'Edit Contact Data' button 214a may be provided to access occupant records in the database 52. For example, in one preferred embodiment of the present invention, when an individual selects the 'Edit Contact Data' button 214a, configuration sub-page 220 of FIG. 13A may be presented and made available. This configuration page may be arranged to enable an individual to add, edit, and or remove occupant records and fields, as required. In addition, using the page tabs provided, an individual may also input and update Emergency and Off-Premises records as well.

Figure 13B:
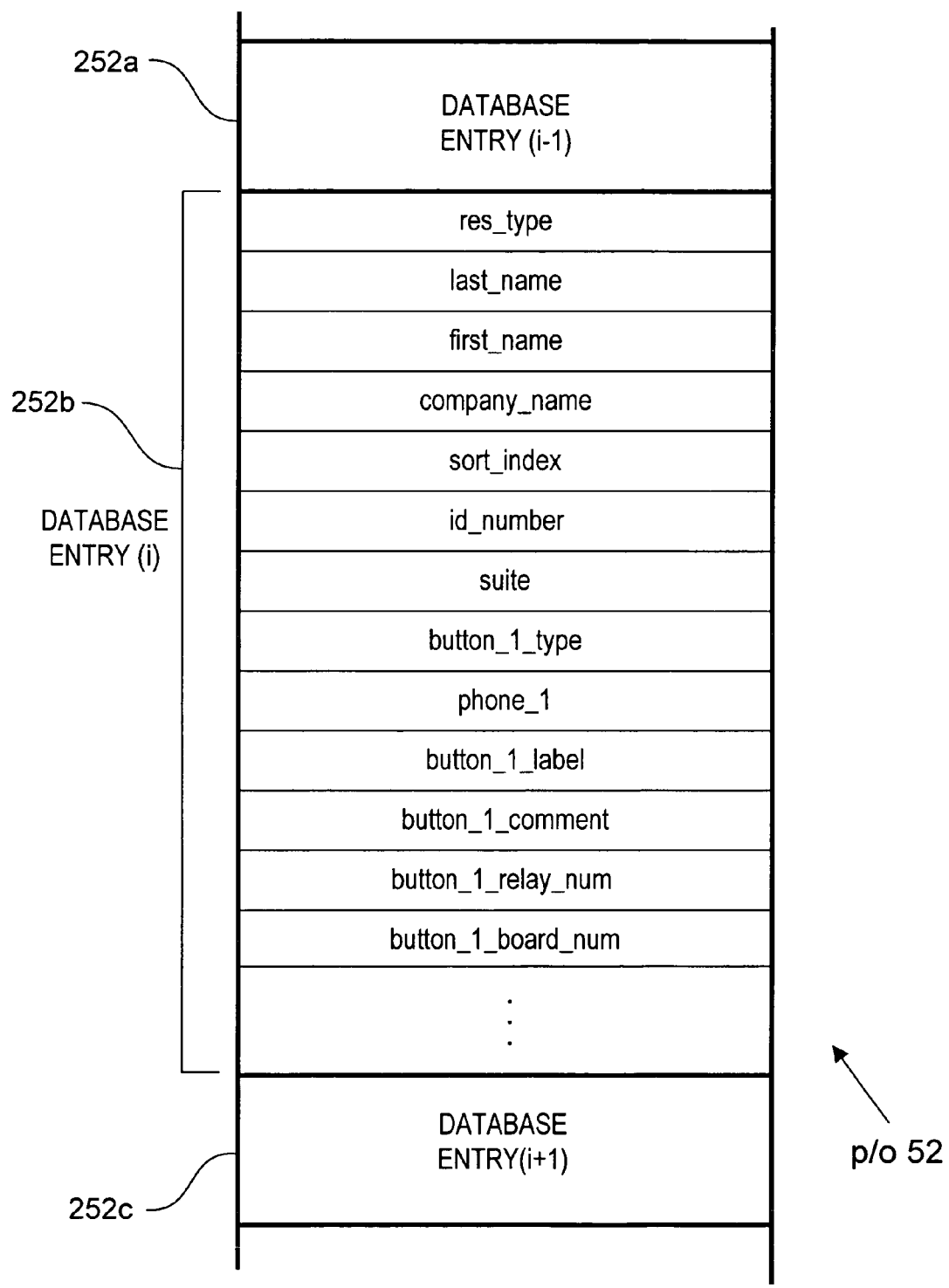
FIG. 13A provides an embodiment of a possible editor screen that may be used to establish and maintain a database containing occupant related information, such as that depicted in the database records of FIG. 13B.
FIG. 13C presents tables of possible fields that may be provided by preferred records of the database, along with a concise statement defining each field listed.

Regarding database records, it is contemplated that a plurality of fields may be provided, with a subset of these fields presented to a user at any one instant or in any one occupant listing. For example, consider the representation of records 252 (general) of database 52, a portion of which is illustrated in FIG. 13B in a simplified graphical representation. Although the database 52 may contain many records of occupant and other information, for simplicity only 3 occupant related records have been shown in FIG. 13B. A first of the series of three records is database record 252a, the 'i−1' record. Next, shown with a plurality of possible fields explicitly included, is database record 252b. Finally, the record 252c is shown, which is the i+1 record.

As shown in FIG. 13C, Table 1 provides a concise summary of a number of possible fields for storing occupant related information within a record of the database 52. For the fields listed there is a field name, a field description, and a preferred field type provided. For completeness, each of the record fields of Table 1 will be concisely discussed. A 'res-type' field may be employed to indicate the type of occupant. For example, if the occupant is a resident or a business/professional entity. The 'last_name' and 'first_name' fields may be used to enter the last and first name, respectively, of a residential occupant. Similarly, the 'company_name' field may be used to hold the name of a business, company, or professional.

The 'sort_index' provides a flexible mechanism that is employed when records are sorted and displayed. For example, when considering the partitioned occupant listing page 160 of FIG. 9, note that the listing for 'Dr. William Gold, D.D.S.' is sorted in the list based on the letter 'G', and not 'D' for Dr. Accordingly, the sort_index for Dr. Gold's listing would be 13, indicating that the 'G' in Gold is to be used for sorting considerations. Returning to FIG. 13C, an 'id_number' and a 'suite' field may be included, and are examples of other occupant related fields that may or may not be made available to a visitor.

The remaining fields listed in Table 1 are associated with occupant contacting, and visitor access/entry functions, that are providable with the present invention. Briefly, the 'button_i_type' fields define the function required for a contact icon/button. It may be noted that the 'i' in 'button_i_type will normally be a number (such as 1, 2, . . . ). For example, there are two such fields depicted in Table 1 of FIG. 13C. A contact icon may most often be used to dial and ring an occupant phone. Alternately the contact icon may activate a relay causing an energizing of an audio/visual signaling device (e.g., a buzzer). If phone contact icons are included, additional fields may then be provided to enable phone numbers to be stored, along with labels and comments that may be provided for each telephone contact icon.

When a relay interface module 100 is included with an embodiment of the present directory display and configurable entry system, then at least one 'button_i_relay_num' field, and possibly one or more 'button_i_board_num' fields may be used to define, respectively, the relay number and board number for each electronically controlled switch of the invention. Essentially, the 'button_i_relay_num' field, and any included 'button_i_board_num' fields, define an address for controlling a respective electronic switch, while not affecting the present state of other electronic switches of the embodiment.

The second table provided of FIG. 13C, which is designated Table 2, defines a small number of other possible fields that may be set and used by the application program for configuring and customizing an installation of an embodiment of the present invention. Fields may be omitted, or added, as needed for an actual embodiment and the requirements of the specific location where the embodiment is installed and operated.

It must be understood that the database fields depicted in Table 1, Table 2, and elsewhere in this disclosure are but one possible example of a simple and basic collection of possible database fields that are consistent with the present invention. Others are certainly possible. For example, the fields of Table 1 may be expanded by including multiple first names, such as 'first_name_1', 'first_name_2', etc. Further, only two buttons are supported by the fields listed in Table 1. However, any number of buttons may be provided, limited by the available real estate of a particular embodiment of an occupant contact page 170/170a.

While there have been described herein a plurality of the currently preferred embodiments of the methods and means of the present invention, those skilled in the art will recognize that other and further modifications may be made without departing from the invention. For example, when considering the structure of embodiments disclosed, even though the functional blocks of the computer unit 50, the user interface 40, and the relay interface module 100 are shown as separated portions, which may be the case in a number of preferred embodiments, these units may certainly be combined. That is the computer unit 50 and user interface 40 may actually be provided with a single housing. In addition, the function or a portion of the function of the relay interface module 100, may be provided integrated into a suitably modified computer unit 50. As such, the foregoing descriptions of the specific embodiments of the present invention have been provided for the purposes of illustration, description, and enablement. They are not intended to be exhaustive or to limit the invention to the specific forms disclosed and or illustrated. Obviously numerous modifications and alterations are possible in light of the above teachings, and it is fully intended to claim all modifications and variations that fall within the scope of the appended claims provided hereinafter.

What is claimed is:

1. A multi-page graphical user interface for readily accessing information, including occupant related information, which is stored in a database, the graphical user interface comprising:
   a) a partitioned occupant listing page, which is comprised of a plurality of portions including a first portion of the partitioned occupant listing page for providing at least one of the following:
      i) a plurality of predefined jump tags, provided as iconic symbols, with each jump tag selectable by a user for causing the displaying of a predefined subset of records from the database for viewing by the user; and
      ii) at least two direction icons;
   b) a second portion of the partitioned occupant listing page of the graphical user interface that is available for displaying one of:
      i) an initial subset of occupant records of the database, which are displayed by default when the partitioned occupant listing page of graphical user interface is first presented to a user; and
      ii) a subset of occupant records, selected by way of a user selecting a jump tag presented within the first portion of the partitioned occupant listing page; and
   c) an occupant contact page that is presented to a user by the user selecting one of the occupant records displayed in the second portion of the partitioned occupant listing page, with the occupant contact page providing any available contact icons associated with the selected occupant of interest at the location;
   d) with each provided contact icon is selectable by a single user action for attempting a contacting of the respective occupant without the user knowing any actual contact information of the occupant;
   e) wherein the graphical user interface thereby provides a multi-page interface enabling a user to readily access occupant related information for occupants of a location, with the occupant related information accessed from a pre-established database, with the information accessed for at least one of:
      i) attempting a contacting of an occupant of the location at which the graphical user interface is utilized and operated;
      ii) providing directions for finding the occupant at the location.

2. The graphical user interface in accordance with claim 1, wherein initially a user is presented with an initial welcome page including at least one of the following:
   a) the address of the location at which the graphical user interface is utilized;
   b) a welcome graphical image; and
   c) a textual prompt of a required user action to begin to access occupant related information useful for contacting at least one occupant of the location, with the action causing the partitioned occupant listing page of the graphical user interface to be displayed.

3. The graphical user interface in accordance with claim 1, wherein upon a selecting of a presented contact icon, an attempt at contacting the occupant is effected by at least one of:
   a) placing a call to a wired communication device of the occupant located within the location;
   b) placing a call to a wired communication device of the occupant not located within the location;
   c) placing a call to a wireless communication device of the occupant, even while the occupant and the wireless communication device are not at the location;
   d) activating a signaling device of an occupant.

4. The graphical user interface in accordance with claim 3, wherein the graphical user interface is displayed upon an electronic display screen wherein user selections are effected by using at least one of:
   a) an electronic pointing device, enabling a pointer displayed upon the graphical user interface to be moved over a desired item or region of the electronic display screen, and subsequently selected; and
   b) a touch screen electronic display screen enabling a user to select a displayed item or region by tapping directly upon the item or region.

5. The graphical user interface in accordance with claim 4, wherein the first portion of the partitioned occupant listing page provides a plurality of iconic symbols including letters of the alphabet, the numbers from 0 to 9, and a plurality of direction indicating iconic symbols.

6. The graphical user interface in accordance with claim 5, wherein the direction indicating iconic symbols include an up-icon and a down-icon.

7. The graphical user interface in accordance with claim 1, wherein the occupant contact page is one of:
   a) displayed in the first portion of the partitioned occupant listing page covering at least a plurality of the iconic symbols;
   b) displayed in the second portion of the partitioned occupant listing page; and
   c) displayed at least partially covering at least one of the first portion and the second portion of the partitioned occupant listing page.

8. The graphical user interface in accordance with claim 1, wherein at least one contact icon of the occupant contact page is selectable for causing an attempt at contacting an occupant, by way of a pre-determined communication device.

9. The graphical user interface in accordance with claim 8, wherein a contacting of the occupant is permitted only during pre-defined time periods.

10. The graphical user interface in accordance with claim 1, wherein each database occupant record, containing occupant related information, includes fields indicating:
    a) if the occupant is a resident;
    b) if the occupant is a business entity;
    c) at least one of a last name or a business name;
    d) at least one first name.

11. The graphical user interface in accordance with claim 10, wherein a plurality of database records include fields for at least one of:
    a) business entities, which are not an occupant of the location; and
    b) local emergency entities that may be contacted by a user during an emergency situation.

12. The graphical user interface in accordance with claim 10, wherein each database occupant record further contains at least one field available for storing a phone number to be called when attempting to contact an occupant associated with the occupant record.

13. The graphical user interface in accordance with claim 10, wherein each database occupant record contains a plurality of fields for storing a plurality of phone numbers that are available for presenting to a user in a pre-defined order, encouraging the user to try to contact the occupant in the pre-defined order.

14. The graphical user interface in accordance with claim 10, wherein when multiple occupant records are displayed, residential occupant records are distinguished from business occupant records by one of the residential or business records being displayed using at least one of:
    a) a bold font;
    b) color-coded fonts;
    c) differing font types; and
    d) differing font sizes.

15. A directory display and configurable telephone entry system, comprising:
    a) a user interface including a display device for displaying a multi-page graphical user interface enabling the user to readily access records of a database, including occupant records containing occupant related information associated with occupants of a location at which the directory display and configurable telephone entry system is installed and utilized;
    b) a computer unit that is operatively coupled to the user interface for enabling information to be exchanged between the user interface and the computer unit, with the information including occupant related information presented to a user, as well as user provided information including user provided selections;
    c) a storage sub-system of the computer unit structured for functions including holding, accessing, and as required, updating each of:
       i) a database having occupant records containing occupant related information, portions of which will be presented to a user by way of the user interface and the graphical user interface; and
       ii) an application program providing the operational functionality of the directory display and telephone entry system, including presenting information to the user, accepting user selections, and responding to user selections; and
    d) a modem and communication interface of the computer unit, with the modem and communication interface available for coupling to a subscriber communication service and a local communication device thereby enabling information to be received and transmitted upon the subscriber communication service and the local communication device;
    e) the modem and communication interface providing functions including enabling the computer unit, under control of the application program, to place a call to a communication device of an occupant of interest, that has been selected by a user, in an attempt at contacting the occupant.

16. The directory display and configurable telephone entry system in accordance with claim 15, further including:
    a) at least one relay interface module including a plurality of addressable electronically controlled switches, and at least one communications port;
    b) with the relay interface module operatively coupled to the computer unit by way of a communication channel supported by at least one included communication port, such that the computer unit may exchange information and commands with the relay interface module, causing any one of:
       i) a sensing of at least one contact closure; and
       ii) an activating of at least one electronically controlled switch.

17. The directory display and configurable telephone entry system in accordance with claim 16, wherein each electronically controlled switch of a relay interface module is individually configurable to be either one of normally-off and normally-on when not being activated.

18. The directory display and configurable telephone entry system in accordance with claim 17, wherein each electronically controlled switch may be activated for a pre-determined time interval, and then de-activated automatically when the time interval has expired.

19. The directory display and configurable telephone entry system in accordance with claim 17, wherein each electronically controlled switch is provided by a single-pole-double-throw relay, and structured having a configuration means to enable the relay to be selectively operated as either a normally-off contact closure or a normally-on contact closure.

20. The directory display and configurable telephone entry system in accordance with claim 16, wherein the relay interface module comprises:
    a) a microcontroller device, with the microcomputer device having a processor, an on-chip memory, at least one communication interface, digital input ports, and digital output ports;
    b) with the on-chip memory containing an application program enabling the exchange of command and status information between the computer unit and the relay interface module.

21. The directory display and configurable telephone entry system in accordance with claim 15, wherein the user interface is provided by one of:
- a) a non-touch screen electronic display screen, and an electronic pointing device enabling a pointer displayed upon the electronic display screen, and superimposed over a displayed page of the graphical user interface, to be moved and positioned until located over a desired item or region of the graphical user interface, and selected by the user; and
- b) a touch screen electronic display screen enabling a user to select a displayed item or region by a direct tapping upon the displayed item or region.

22. The directory display and configurable telephone entry system in accordance with claim 15, wherein the entire user interface substantially provided by a touch screen color flat screen display unit.

23. The directory display and configurable telephone entry system in accordance with claim 22, wherein the flat screen display unit includes at least one:
- a) a speaker module; and
- b) a microphone module;
- c) with each of the speaker module and microphone module operatively coupled to the computer unit.

24. The directory display and configurable telephone entry system in accordance with claim 15, wherein the user interface and the computer unit are provided by one of:
- a) a substantially self-contained desktop computer; and
- b) a substantially self-contained portable computer.

25. The directory display and configurable telephone entry system in accordance with claim 15, wherein the computer unit, the display, and the entire user interface are provided by a tablet portable computer.

26. The directory display and configurable telephone entry system in accordance with claim 15, wherein the modem/communication interface provides access to the database from a remote terminal for accessing and updating the records of the database.

27. A directory display system employing a multi-page graphical user interface, the directory display system comprising:
- a) a computer unit;
- b) means to enable the computer unit to receive selections of a user;
- c) means to enable a displaying of a multi-page graphical user interface, with the graphical user interface providing functions including enabling occupant related information to be displayed for viewing by a user of the directory display system;
- d) wherein the graphical user interface is arranged with:
  - i) a welcome page, if enabled for use, which is employed for presenting to a user a welcome graphical image containing at least one textual prompt indicating a required initial user action, with the user action causing a presenting of a partitioned occupant listing page of the graphical user interface;
  - ii) the partitioned occupant listing page structured with a plurality of portions, including a first portion of the partitioned occupant listing page providing a plurality of predefined jump tags, with each jump tag selectable by a user for causing a predefined plurality of occupant records of the database to be located, accessed and displayed, at least in part, upon a second portion of the partitioned occupant listing page for user viewing, with the first portion further arranged with at least two direction icons;
  - iii) the second portion of the partitioned occupant listing page of the graphical user interface, which is available for displaying either of an initial plurality of occupant records, which are displayed by default when the partitioned occupant listing page of graphical user interface is first presented to a user, as well as a selected plurality of occupant records, which are displayed as a result of the user selecting an associated jump tag displayed in the first portion of the partitioned occupant listing page;
  - iv) an occupant contact page, which is made visible to a user upon the user selecting one of the displayed occupant records, displayed in the second portion of the partitioned occupant listing page, with the occupant contact page presenting any pre-established contact icons associated with an occupant of the location, with the displayed contact icons selectable for enabling a user to attempt a contacting of the occupant;
- e) with the directory display system thereby providing the multi-page graphical user interface for enabling a user to readily select an occupant listing and attempt a contacting of an occupant of the location.

28. The directory display system of claim 27, wherein the use of the welcome page is enabled during a setup procedure when the directory display system is any one of installed, repaired, and serviced.

29. The directory display system of claim 27, wherein the first portion of the partitioned occupant listing page contains two direction icons provided as an up-icon and a down-icon, enabling the user to scroll forward and backward through a plurality of occupant record listings, so that a user may move to a particular occupant record listing, which may be subsequently selected for causing the occupant contact page to be displayed.

30. The directory display system of claim 27, further including a relay interface module comprising:
- a) a controller, which is structured such that a communication channel may be established for enabling command and status information to be exchanged between the computer unit and the controller of the relay interface module; and
- b) a plurality of the electronically controlled switches, which may be configured to be activated and de-activated under control of the controller, as determined by commands sent from the computer unit, and received and processed by the controller.

31. The directory display system of claim 30, wherein the relay interface module is located a distance from the computer unit, with the actual distance determining the type of communication channel employed to operatively couple the computer unit to the relay interface module.

32. The directory display system of claim 30, wherein each electronically controlled switch is provided by at least one of:
- a) an electro-mechanical relay that is configurable to be one of normally-off and normally-on, when not being activated by the controller, and independent of other included electronically controlled switches;
- b) an electronic switching device that is software configurable to be either one of normally-on and normally-off, when not being activated by the controller.

33. The directory display system of claim 32, wherein each electronically controlled switch may be activated by the controller for a pre-determined time interval, and then de-activated automatically after the time interval has expired.

* * * * *